US011465051B2

(12) United States Patent
Eads

(10) Patent No.: US 11,465,051 B2
(45) Date of Patent: Oct. 11, 2022

(54) SYSTEMS AND METHODS FOR COACHING A USER FOR GAME PLAY

(71) Applicant: Sony Interactive Entertainment Inc., Tokyo (JP)

(72) Inventor: Josh Eads, San Francisco, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 168 days.

(21) Appl. No.: 16/914,157

(22) Filed: Jun. 26, 2020

(65) Prior Publication Data

US 2021/0402302 A1 Dec. 30, 2021

(51) Int. Cl.
 *A63F 13/67* (2014.01)
 *A63F 13/537* (2014.01)
 *G06F 3/04842* (2022.01)

(52) U.S. Cl.
 CPC ............ *A63F 13/67* (2014.09); *A63F 13/537* (2014.09); *G06F 3/04842* (2013.01)

(58) Field of Classification Search
 CPC ..... A63F 13/67; A63F 13/537; G06F 3/04842
 See application file for complete search history.

(56) References Cited

U.S. PATENT DOCUMENTS

| | | | |
|---|---|---|---|
| 2010/0069156 A1 | 3/2010 | Riego | |
| 2011/0281648 A1 | 11/2011 | Weising | |
| 2012/0254934 A1* | 10/2012 | McBrearty | G16H 40/67 340/870.11 |
| 2012/0270618 A1* | 10/2012 | Abramoff | G07F 17/3288 463/9 |
| 2012/0283021 A1 | 11/2012 | Riego | |
| 2013/0041590 A1* | 2/2013 | Burich | G06F 11/3006 702/19 |
| 2013/0060168 A1* | 3/2013 | Chu | A42B 3/046 600/595 |

(Continued)

FOREIGN PATENT DOCUMENTS

WO 2017030844 A1 2/2017

OTHER PUBLICATIONS

PCT/US2021/034115, PCT/ISA/210, Notification of the International Search Report and the Written Opinion of the International Searching Authority, or the Declaration, International Searching Authority, European Patent Office, NL-2280 HV Rijswijk, dated Aug. 16, 2021.

*Primary Examiner* — Reginald A Renwick
(74) *Attorney, Agent, or Firm* — Penilla IP, APC

(57) ABSTRACT

A method for processing a self-coaching interface is described. The method includes identifying a gameplay event during gameplay by a user. The gameplay event is tagged as falling below a skill threshold. The method further includes generating a recording for a window of time for the gameplay event and processing game telemetry for the recording of the gameplay event. The game telemetry is used to identify a progression of interactive actions before the gameplay event for the window of time. The method includes generating overlay content in the self-coaching interface. The overlay content is applied to one or more image frames of the recording when viewed via the self-coaching interface. The overlay content appears in the one or more image frames during a playback of the recording. The overlay content provides hints for increasing a skill of the user to be above the skill threshold.

20 Claims, 22 Drawing Sheets

(56) References Cited

U.S. PATENT DOCUMENTS

| | | |
|---|---|---|
| 2017/0266566 A1 | 9/2017 | Riego |
| 2018/0280802 A1 | 10/2018 | Stroud |
| 2018/0322337 A1* | 11/2018 | Marty ....................... G06T 7/20 |
| 2020/0298125 A1 | 9/2020 | Stroud |
| 2021/0001224 A1 | 1/2021 | Weising |
| 2021/0370183 A1* | 12/2021 | Dorn ....................... A63F 13/79 |

* cited by examiner

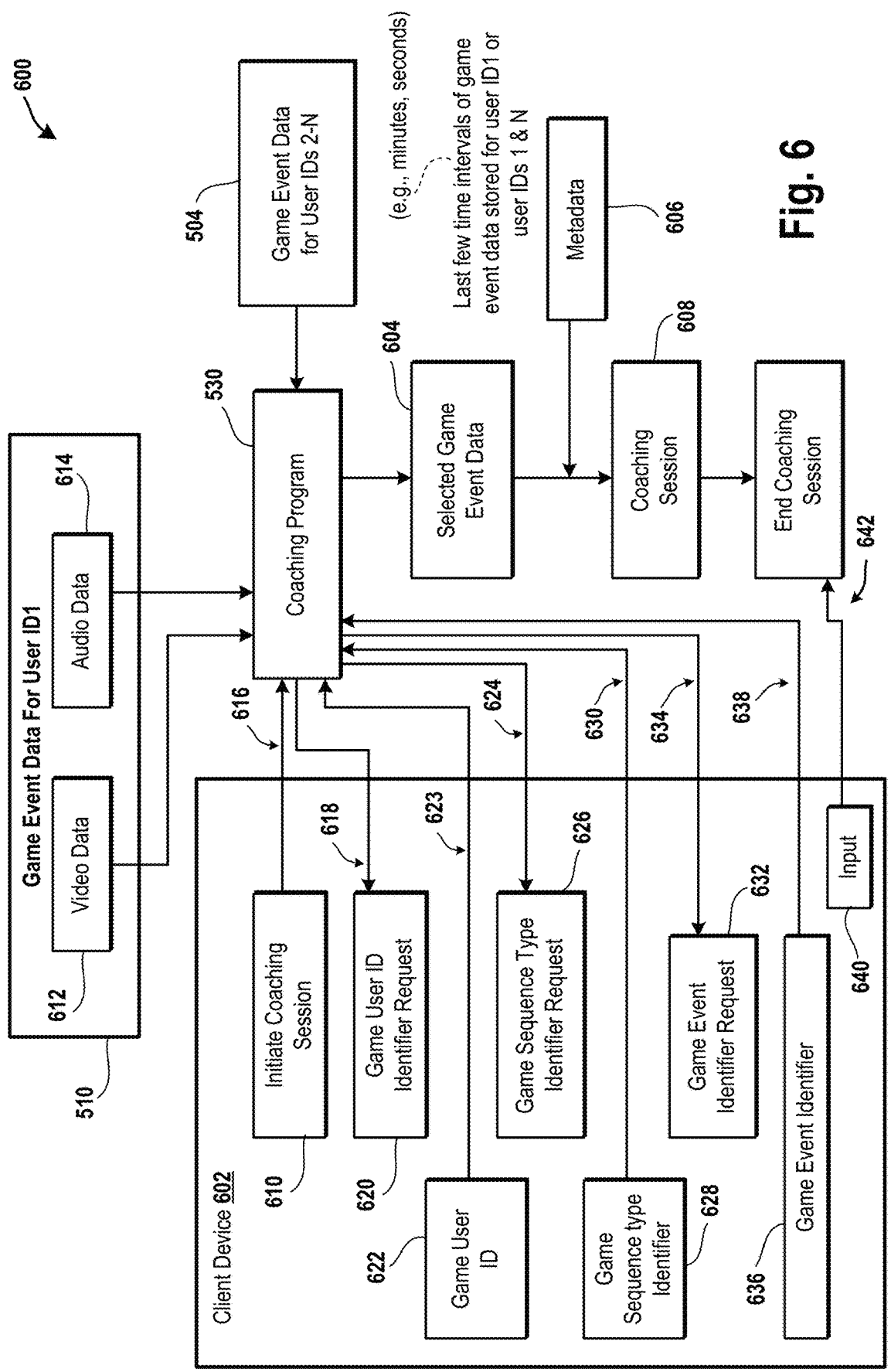

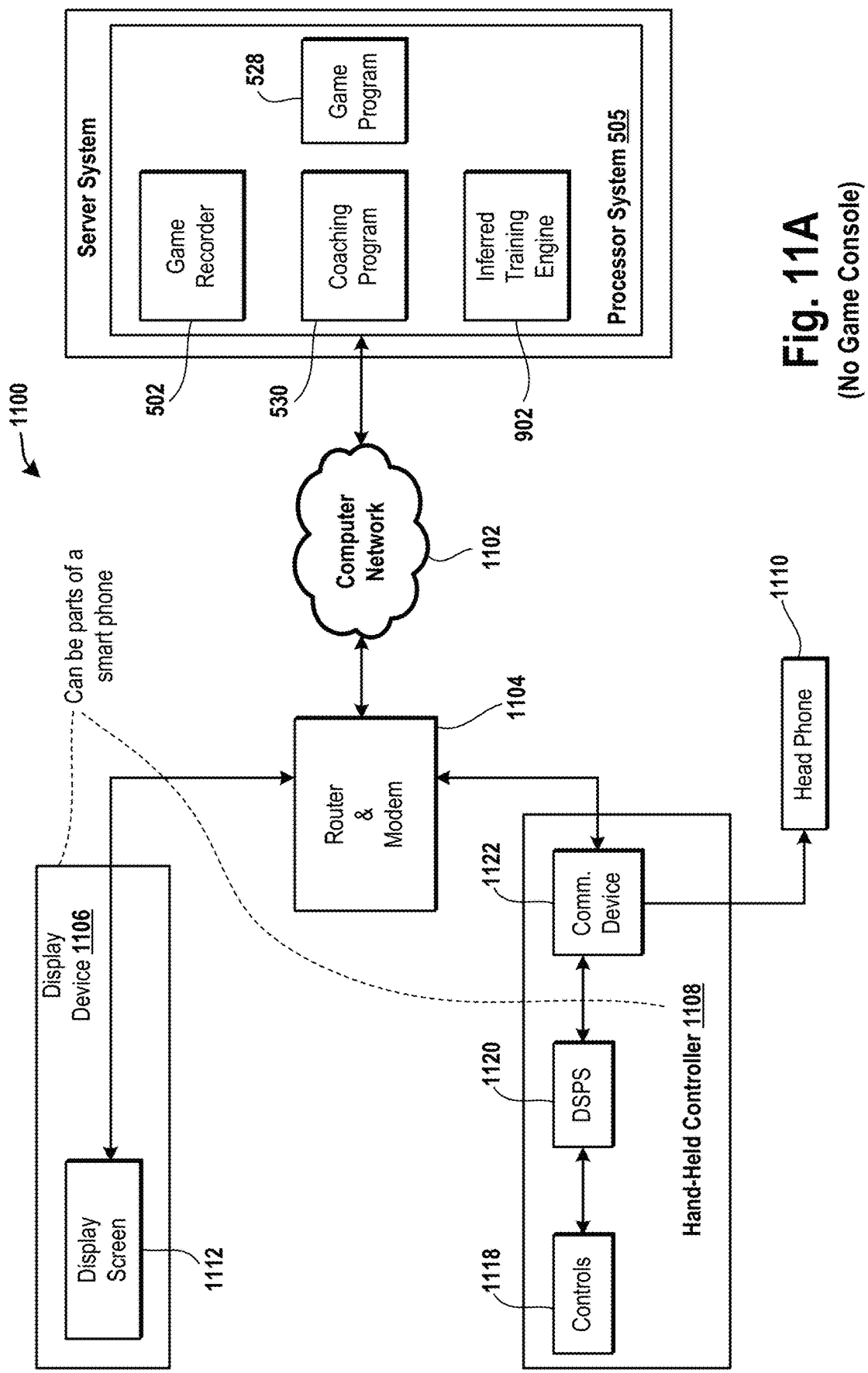

SYSTEMS AND METHODS FOR COACHING A USER FOR GAME PLAY

FIELD

The present disclosure relates to systems and methods for coaching a user for game play.

BACKGROUND

It is common that video games are designed to present challenges for players to figure out how to overcome. In some games, this may be a challenge of besting another player in a multiplayer setting, and in other games, this may be a challenge of defeating a difficult computer-controlled entity. Typically, the players attempt these challenges multiple times, and slowly learn several intricacies of the games to improve their skill. Additionally, some of the most challenging situations may not occur often, making it harder for the players to remember lessons learned during previous encounters. Some players may become frustrated with the amount of time for improving their skill at a particular game.

It is in this context that embodiments of the invention arise.

SUMMARY

Embodiments of the present disclosure provide systems and methods for coaching a user for game play.

In an embodiment, a coaching system is provided to reduce frustration of players of various game genres in learning a new game. The coaching accelerates skill improvement for the players.

In one embodiment, a series of gameplay events, such as death of a virtual user and an attack missed by the virtual user, are recorded over time and collected into grouped sequences. The systems and methods, described herein, provide a user interface (UI) to review video and controller input capture of previous failures in specific situations to examine and learn what alternative strategy should have been used. The systems and methods highlight the failures that occur during a play of the game.

In an embodiment, the systems and methods described herein use game hooks or telemetry to identify points, such as gameplay events, during the game where coaching can be applied. For example, coaching can be applied after death of the virtual user or after an attack on the virtual user. A recording of the game for a last X amount of time units before a gameplay event is saved in a memory device, where X is a positive real number. The recording is saved with a tag describing an issue, such as death of the virtual user or attack on the virtual user. The systems and methods generate a dedicated UI to replay the recording with overlays, such as input selections received from the user. Also, a timeline scrubber is provided along the dedicated UI to allow the user to scroll backward and forward during the last X amount of time units. Also, the dedicated UI includes hints on mechanics or situations to provide to the user to increase a skill level of the user.

In one embodiment, a method for processing a self-coaching interface is described. The method includes identifying a gameplay event during gameplay by a user. The gameplay event is tagged as falling below a skill threshold. The method further includes generating a recording for a window of time for the gameplay event and processing game telemetry for the recording of the gameplay event. The game telemetry is used to identify a progression of interactive actions before the gameplay event for the window of time. The method includes generating overlay content in the self-coaching interface. The overlay content is applied to one or more image frames of the recording when viewed via the self-coaching interface. The overlay content appears in the one or more image frames during a playback of the recording. The overlay content provides hints for increasing a skill of the user to be above the skill threshold.

In an embodiment, a method facilitating self-coaching of a player during a play of a game is described. The method includes recording a series of gameplay events as game event data. The series of gameplay events is associated with a user identity (ID). The method further includes classifying the series of gameplay events based on a plurality of predetermined gameplay events and receiving one or more inputs to initiate a coaching session regarding one of the plurality of predetermined gameplay events. In response to the one or more inputs, the method includes obtaining a portion of the game event data. The portion of game event data is recorded within a predetermined time period of occurrence of the one of gameplay events of the series. The one of the gameplay events of the series is classified as one of the plurality of predetermined events. The method includes displaying the portion of the game event data with a timeline bar to facilitate the self-coaching of the player.

In an embodiment, the series of gameplay events are associated with the user identity when the game having the series of gameplay events is accessed after authenticating the user identity.

In one embodiment, the method also includes receiving an input indicating a time along the timeline bar and translating the portion of game event data according to the input indicating the time.

In an embodiment, the method also includes recording an additional series of gameplay events as additional game event data. The additional series of gameplay events is associated with the user ID. The method includes classifying the additional series of gameplay events based on the plurality of predetermined gameplay events. In response to the one or more inputs, the method includes obtaining a portion of the additional game event data. The additional portion of game event data is recorded within the predetermined time period of occurrence of the one of gameplay events of the additional series. The one of the gameplay events of the additional series is classified as one of the plurality of predetermined events. The method includes displaying the portion of the additional game event data with the timeline bar to facilitate the self-coaching of the player.

In one embodiment, the method includes recording an additional series of gameplay events as additional game event data. The additional series of gameplay events is associated with another user ID. The method includes classifying the additional series of gameplay events based on the plurality of predetermined gameplay events. In response to the one or more inputs, the method includes obtaining a portion of the additional game event data. The additional portion of game event data is recorded within the predetermined time period of occurrence of the one of gameplay events of the additional series. The one of the gameplay events of the additional series is classified as one of the plurality of predetermined events. The method includes displaying the portion of the additional game event data with the timeline bar to facilitate the self-coaching of the player.

Some advantages of the herein described systems and methods include providing a user interface that enables users to understand a video game and quickly achieve skills for playing the game. Also, the video game is improved because a coaching session is associated with the video game and accessed to allow the user to self-coach. Furthermore, unnecessary network traffic is reduced. When the user applies lessons learned during the coaching session to play the video game, the user can play the video game by making less errors compared to those made without applying the coaching session. These errors unnecessary increase the network traffic between a client device used by the user and a server system in which the video game is executed.

Other aspects of the present disclosure will become apparent from the following detailed description, taken in conjunction with the accompanying drawings, illustrating by way of example the principles of embodiments described in the present disclosure.

BRIEF DESCRIPTION OF THE DRAWINGS

Various embodiments of the present disclosure are best understood by reference to the following description taken in conjunction with the accompanying drawings in which:

FIG. 6 is a diagram of an embodiment of a system to illustrate use of a coaching program to generate a coaching session for training a user.

FIG. 11A is a diagram of an embodiment of a system to illustrate a communication via a router and modem and a computer network between a processor system and multiple devices.

DETAILED DESCRIPTION

Systems and methods for coaching a user for game play are described. It should be noted that various embodiments of the present disclosure are practiced without some or all of these specific details. In other instances, well known process operations have not been described in detail in order not to unnecessarily obscure various embodiments of the present disclosure.

Figure 1:
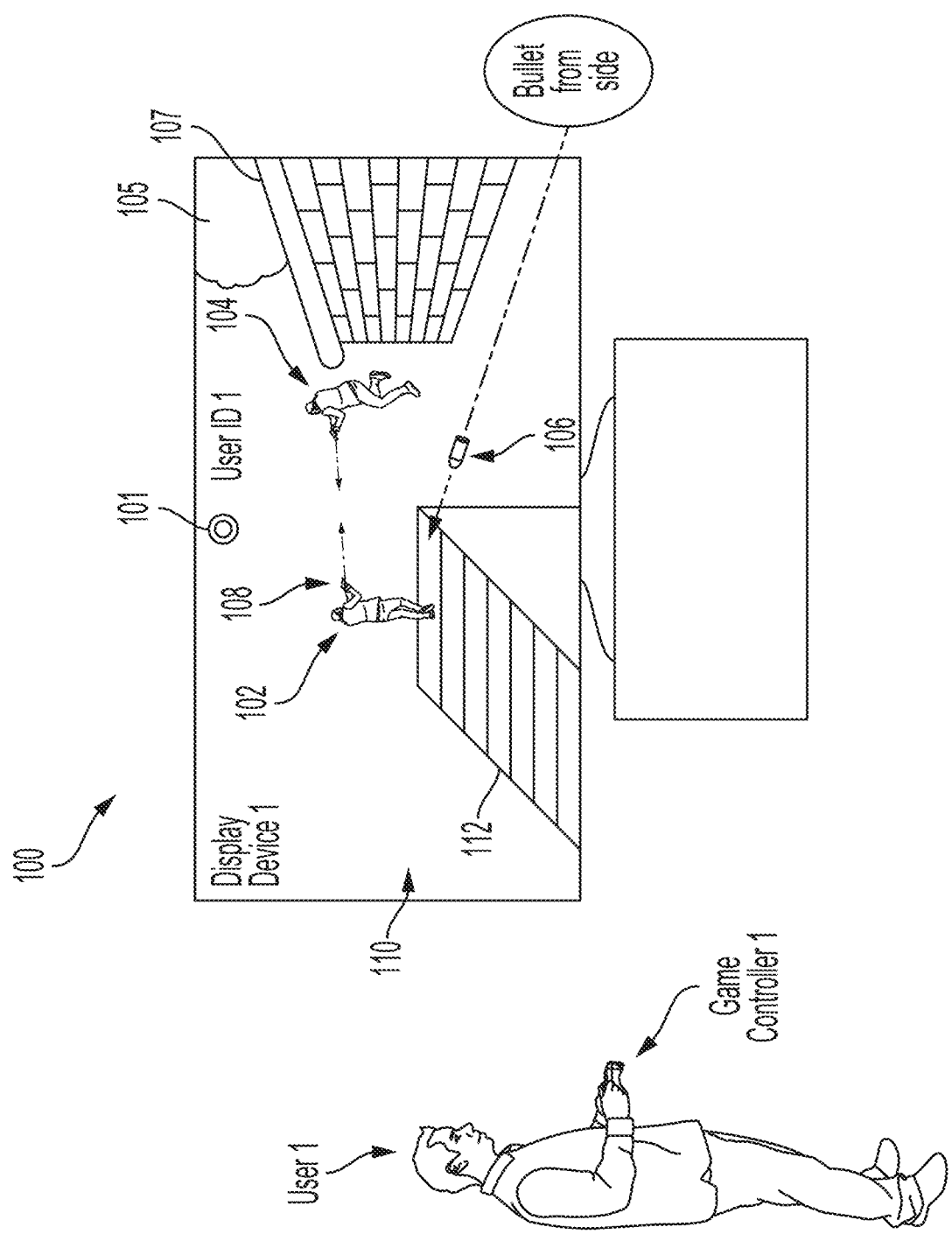
FIG. 1 is a diagram of an embodiment of a system to illustrate a play of a game.

FIG. 1 is a diagram of an embodiment of a system 100 to illustrate a play of a game. The system 100 includes a display device 1 that displays a virtual scene 110 of the game. The display device 1 has a camera 101 that captures one or more images of a real-world environment in front of the camera 101. For example, the camera 101 captures one or more images within a field-of-view of the camera 101. As an example, each virtual scene is an image frame. In one embodiment, the terms image and image frame are used herein interchangeably. Examples of a display device, as used herein, include a smart television, a television, a plasma display device, a liquid crystal display (LCD) device, and a light emitting diode (LED) display device. A user 1 is playing the game, such as a video game, by using a game controller 1. Examples of the video game include a single player game or a multi-player game. Examples of a game controller 1 include a Playstation™ controller, an Xbox™ controller, and a Nintendo™ controller. As an example, a game controller includes multiple joysticks and multiple buttons.

The display device 1 displays multiple images of the game. The user 1 logs into a user account 1 that is assigned to the user 1 by a server system to access the game from the server system. For example, a user identity (ID) assigned to a user and a password assigned to the user by the server system are authenticated by the server system to determine to allow the user to access the game.

Upon accessing the game, the user 1 plays the game by using the game controller 1. During the play of the game, the virtual scene 110 is generated and a user ID 1 assigned to the user 1 is displayed in the virtual scene 110.

In the game, the user 1 uses the game controller 1 to build a virtual ramp 112 on which a virtual user 102 can climb to have a height advantage over another virtual user 104. The virtual user 102, the virtual ramp 112, and the virtual user 104 are within the virtual scene 110. Also, in the game, movement of the virtual user 102 is controlled by the user 1 with the game controller 1. The user 1 uses the game controller 1 to control a virtual gun 108 that is held by the virtual user 102. For example, the user 1 uses the game controller 1 to control the virtual gun 108 to shoot at the virtual user 104. The virtual gun 108 is a portion of the virtual scene 110. The virtual user 104 is controlled by another user, such as a user 2 or a user 3, in the multi-player game.

During the play of the game, in the virtual scene 110, a virtual bullet 106 is directed towards the virtual user 102 while the virtual user 102 is shooting at the virtual user 104 and the virtual user 104 is shooting at the virtual user 102. The virtual bullet 106 is directed towards to the virtual user 102 from a side of the virtual user 102. The virtual scene 110 does not include a virtual user that shot the virtual bullet 106 at the virtual user 102. The virtual scene 110 includes a virtual tree 105 and a virtual wall 107. It should be noted that each of the virtual tree 105, the virtual wall 107, the virtual ramp 112, the virtual user 102, the virtual gun 108, the virtual bullet 108, and the virtual user 104 is an example of a virtual object.

In one embodiment, the server system authenticates a user ID and a password to allow a user to access multiple games for game play.

In an embodiment, instead of the display device 1, a head-mounted display (HMD) is used. The HMD is worn by the user 1 on his/her head.

Figure 2:
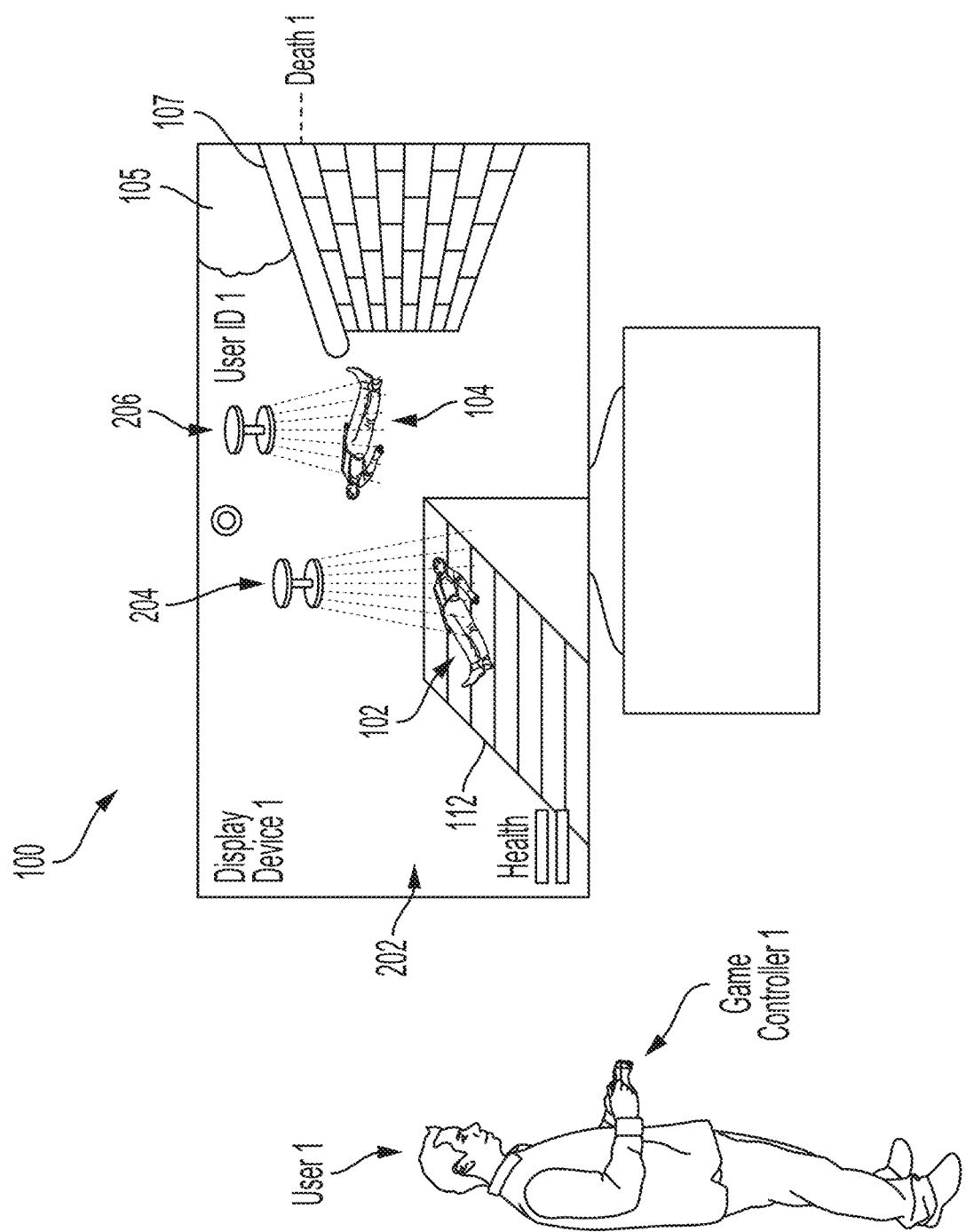
FIG. 2 is a diagram of an embodiment of the system to illustrate a virtual scene of the game.

FIG. 2 is a diagram of an embodiment of the system 100 to illustrate a virtual scene 202 of the game. The virtual scene 202 is displayed on the display device 1 and follows the virtual scene 110 during the play of the game. For example, both the virtual scenes 110 and 202 are displayed during the same gaming session. The user 1 is not able to save the virtual user 102 from being hit by the virtual bullet 106 (FIG. 1). After the virtual bullet 108 hits the virtual user 102, the virtual user 102 dies in the game and is beamed by a virtual drone 204 of the virtual scene 202. Also, before the virtual user 102 dies in the game, the user 1 manages to control the game controller 1 to further control the virtual user 102 and the virtual gun 108 (FIG. 1) to kill the virtual user 104. When the virtual user 104 is killed, the virtual user 104 is beamed by another virtual drone 206 in the virtual scene 202. Also, in the virtual scene 202, the user ID1 is displayed.

Figure 3:
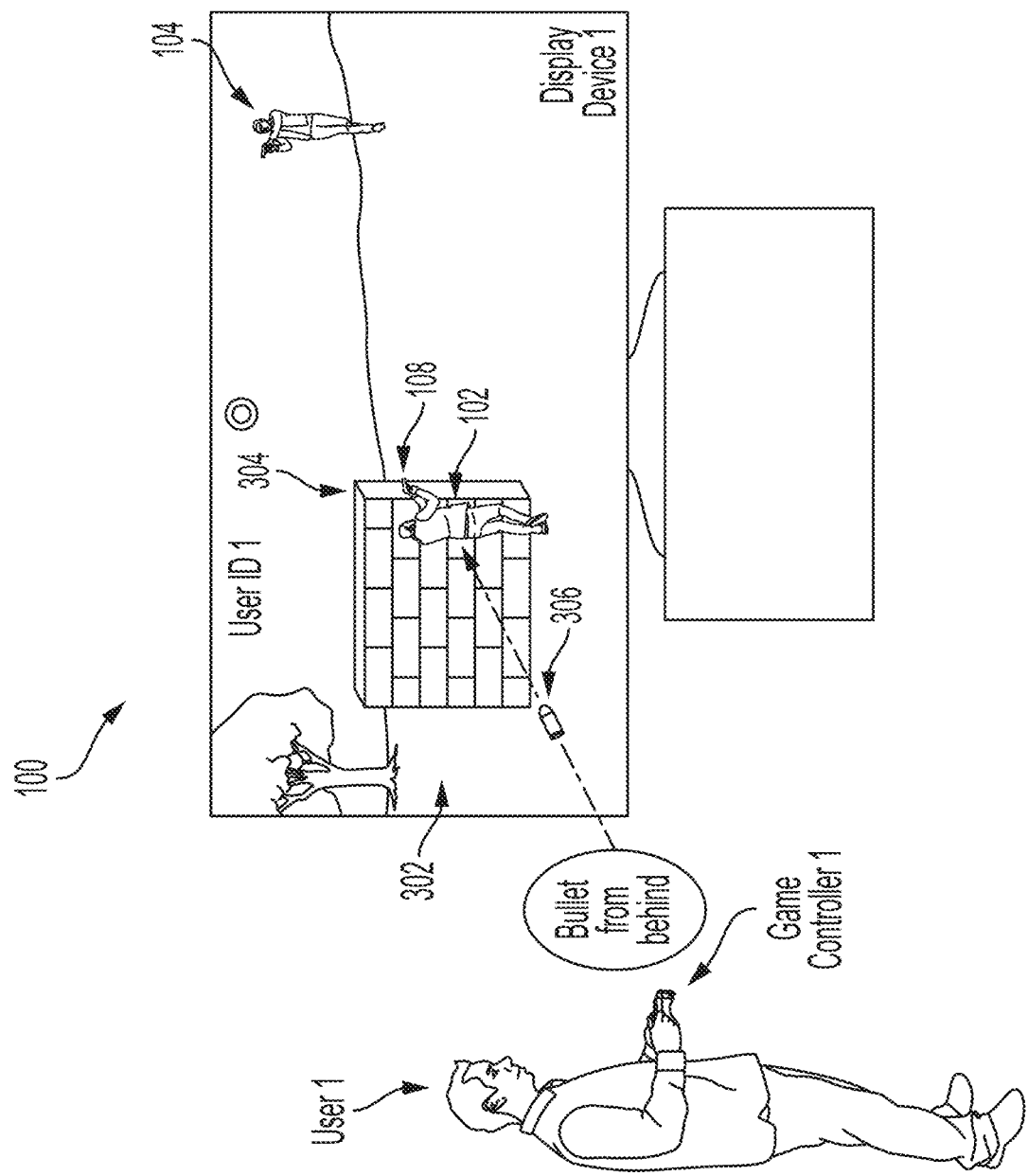
FIG. 3 is a diagram of an embodiment of the system of FIG. 1 to illustrate another virtual scene of the game.

FIG. 3 is a diagram of an embodiment of the system 100 to illustrate another virtual scene 302 of the game. The virtual scene 302 is displayed after the virtual scene 202 (FIG. 2) is displayed or before the virtual scene 110 (FIG. 1) is displayed. In the virtual scene 302, the virtual user 102 is controlled by the user 1 via the game controller 1. The virtual scene 302 is displayed on the display device 1. The virtual user 102 is controlled to use the virtual gun 108 to shoot at the virtual user 104. Also, the virtual scene 302 includes a virtual wall 304 built by the virtual user 102. For example, the user 1 uses the game controller 1 to control the virtual user 102 to build the virtual wall 304 to protect the virtual user 102 from virtual bullets being shot by the virtual user 104.

In the virtual scene 302, a virtual bullet 306 hits the virtual user 102 from behind. The user 1 cannot see, from the virtual scene 302, which virtual user shot the virtual bullet 306 at the virtual user 102. The virtual scene 302 does not include a virtual user that shot the virtual bullet 306 at the virtual user 102.

It should be noted that the virtual scene 302 is displayed on the display device 1 during a gaming session that is the same or different from a gaming session in which the virtual scenes 110 and 202 of FIGS. 1 and 2 are displayed. For example, after the virtual user 102 dies in the virtual scene 202, a game program of the game is executed by a processor of the server system to provide a waiting time period in which the user 1 waits for the virtual user 102 to respawn or rejuvenate or to come alive. An example of a processor, as used herein, includes a microprocessor or a microcontroller or a central processing unit (CPU) or an application specific integrated circuit (ASIC) or a programmable logic device (PLD). The waiting time period occurs before the game displays the virtual scene 302. In this example, the user 1 does not log out of the user account 1 between the display of the virtual scenes 202 and 302, and so the virtual scenes 110, 202, and 302 are displayed during the same gaming session. As another example, after the virtual user 102 dies in the virtual scene 202, the user 1 logs out of the user account 1. The user 1 later logs into the user account 1. After the user 1 logs into the user account 1, the virtual scene 302 is displayed. In this example, the virtual scene 302 is displayed during a gaming session that is different from the gaming session in which the virtual scenes 110 and 202 are displayed.

In one embodiment, a gaming session ends at a time the virtual user 102 that is controlled by the user 1 either dies or wins the gaming session. The virtual user 102 wins the gaming session when the virtual user 102 kills all other virtual users in the gaming session or survives beyond a prestored time period during the gaming session. Once the virtual user 102 dies, the virtual user 102 can be respawned and another gaming session begins, and the other gaming session ends either when the virtual 102 dies or wins the other gaming session.

Figure 4:
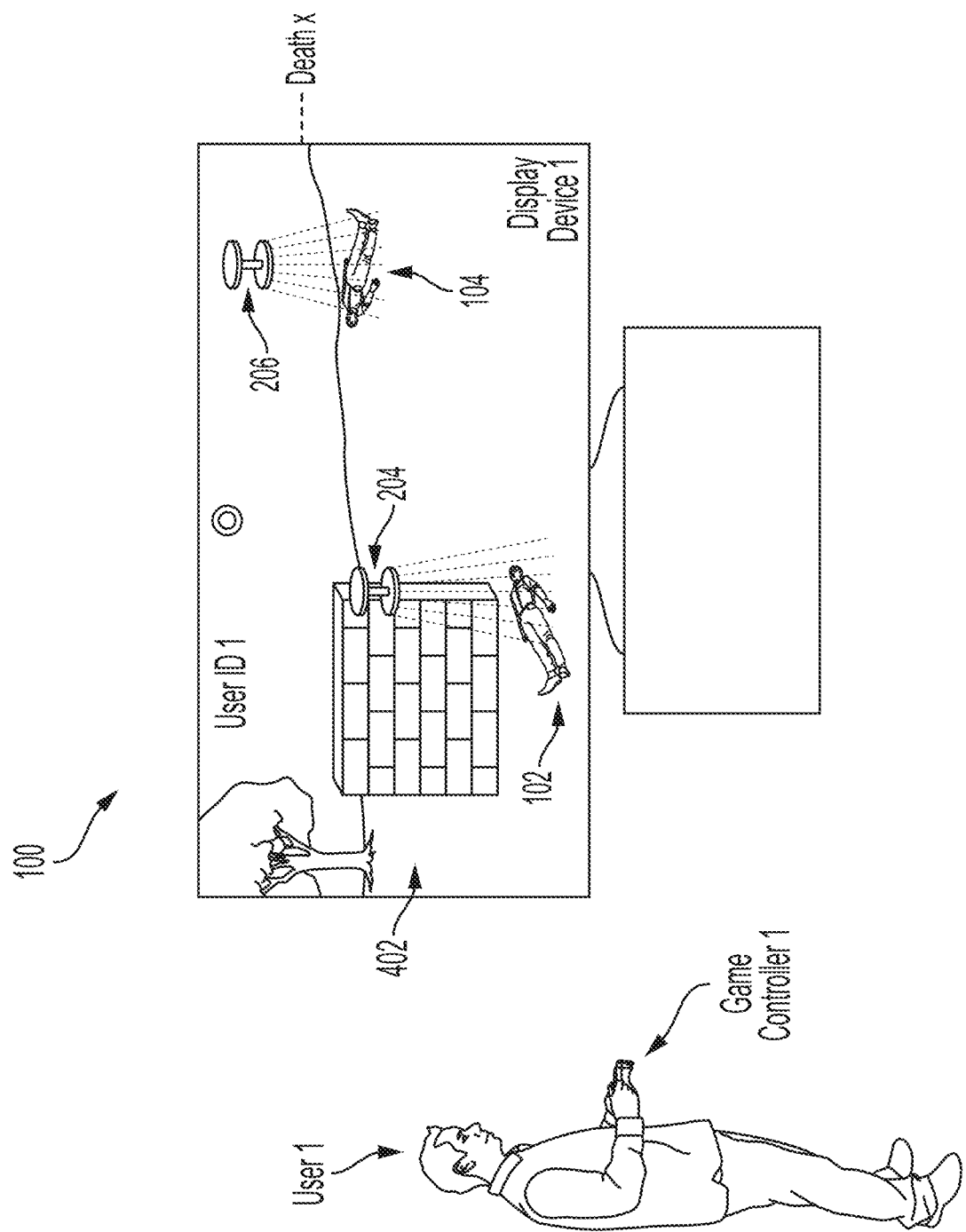
FIG. 4 is a diagram of an embodiment of the system of FIG. 1 to illustrate yet another virtual scene in which a virtual user dies.

FIG. 4 is a diagram of an embodiment of the system 100 to illustrate yet another virtual scene 402 in which the virtual user 102 dies. The virtual scene 402 is displayed after the virtual scene 302 (FIG. 3) is displayed. For example, both the virtual scenes 302 and 402 are displayed during the same gaming session. In the virtual scene 402, the virtual users 102 and 104 are killed. The virtual user 102 is killed by the virtual bullet 306 (FIG. 3). The virtual scene 402 includes the virtual drones 204 and 206 used to beam in the virtual users 102 and 104.

Figure 5A:
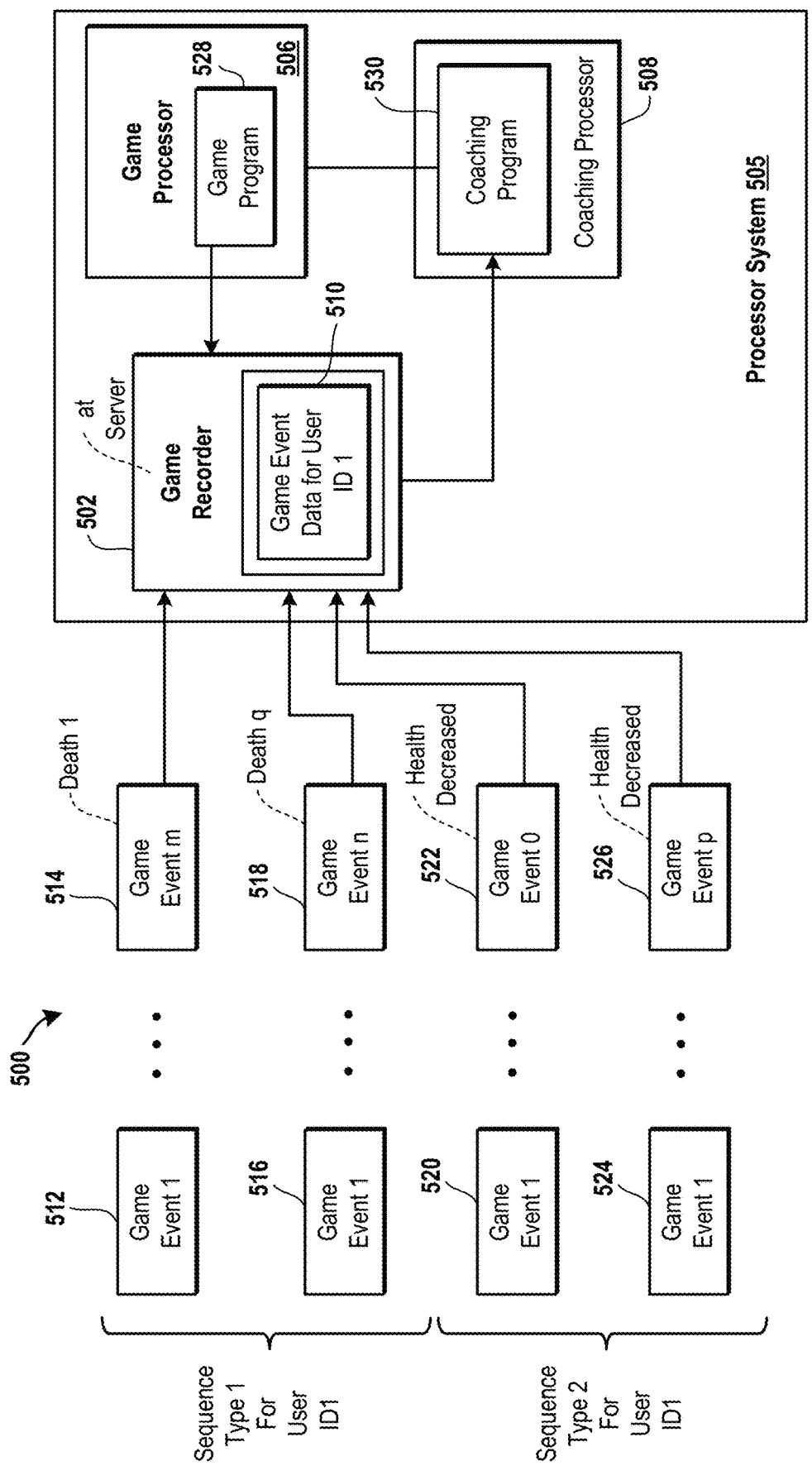
FIG. 5A is a diagram of an embodiment of a system to illustrate recording of game event data by a game recorder for a user ID1.

FIG. 5A is a diagram of an embodiment of a system 500 to illustrate the recording of game event data 510 by a game recorder 502. The system 500 includes a processor system 505. An example of a processor system 505 is a server system, which includes one or more servers of a data center or of multiple data centers. Another example of the processor system 505 includes one or more processors of the server system. Yet another example of the processor system 505 includes one or more virtual machines. An example of the game recorder 502 is a digital video recorder that records both video and audio data of the game event data 510. The processor system 505 includes the game recorder 502, a game processor 506 and a coaching processor 508. The game processor 506 is coupled to the game recorder 502 and to the coaching processor 508. The coaching processor 508 is coupled to the game recorder 502.

The game processor 506 executes a game program 528 to facilitate the play of the game by the user 1 and by other users. As an example, the game program 528 includes a game engine and a rendering engine. The game engine is executed for determining positions and orientations of various virtual objects of a virtual scene. The virtual scene includes a background, which is an example of the virtual object. The rendering engine is executed for determining graphics parameters, such as color, intensity, shading, and lighting of the virtual objects of the virtual scene. The game program 528 is stored in one or more memory devices of the processor system 502 and the one or more memory devices are coupled to the game processor 506. When the game program 528 is executed, the game event data 510 is generated and the virtual scenes 110, 220, 302, and 402 (FIGS. 1-4) are displayed on the display device 1.

The game event data 510 generated is for the user ID1. For example, the virtual scenes 110 (FIG. 1), 202 (FIG. 2), 302 (FIG. 3), and 402 (FIG. 4) of the game event data 510 are generated upon execution of the game program 528. The game program 528 is executed when the user ID 1 and other information, such as a password or a phone number or a combination thereof, of the user 1 are authenticated by the processor system 505.

As an example, the game event data 510 includes multiple game events 1 through m leading up to a death 1 of the virtual user 102 is illustrated in the virtual scene 202 (FIG. 2), where m is a positive integer. To illustrate, the game event data 510 includes data of the virtual scenes 110 (FIG. 1) and 202. To further illustrate, a game event 512 is data of the virtual scene 110 and a game event 514 is data of the virtual scene 202. As another example, the game event data 510 includes multiple game events 1 through n leading up to a death x of the virtual user 102 illustrated in the virtual scene 402 (FIG. 4), where n and x are positive integers. To illustrate, the game event data 510 includes data of the virtual scenes 302 (FIG. 3) and 402. To further illustrate, a game event 516 is data of the virtual scene 302 and a game event 518 is data of the virtual scene 402. As another example, the game event data 510 includes multiple game events 1 through o leading up to a decrease in health level of the virtual user 102 to be below a predetermined threshold, where o is a positive integer. To illustrate, a game event 520 is data of a virtual scene in which the virtual user 102 has full health and a game event 522 is data of a virtual scene in which the virtual user 102's health decreases to be below the predetermined threshold. As yet another example, the game event data 510 includes multiple game events 1 through p leading up to a decrease in health level of the virtual user to be below the predetermined threshold, where p is a positive integer. To illustrate, a game event 524 is data of a virtual scene in which the virtual user 102 has full health and a game event 526 is data of a virtual scene in which the virtual user 102's health decreases to be below the predetermined threshold. It should be noted that a series of game events from the game event 520 to the game event 522 occurs during the same or a different gaming session then an occurrence of a series of game events from the game event 524 to the game event 526.

During execution of the game program 528, the game recorder 502 records the game event data 510. For example, a processor of the game recorder 502 stores or writes the game event data 510 to one or more memory devices of the game recorder 502. Examples of the memory device include a read-only memory, a random access memory, and a combination thereof. To illustrate, the memory device is a flash memory device or a redundant array of independent disks (RAID).

During or after execution of the game program 528, the game event data 510 that is recorded is provided from the game recorder 502 to the coaching processor 508. For example, the coaching processor 508 periodically requests the game recorder 502 for obtaining the game event data 510 from the game recorder 502. In response to reception of a request from the coaching processor 508, the game recorder 502 accesses, such as reads, the game event data 510 from the one or more memory devices of the game recorder 502 and sends the game event data 510 to the coaching processor 508. As another example, the game recorder 502 periodically sends the game event data to the coaching processor 508. To illustrate, without receiving any request from the coaching processor 508, the game recorder 502 accesses the game event data 510 from the one or more memory devices of the game recorder 502 and sends the game event data 510 to the coaching processor 508.

During or after execution of the game program 528, a coaching program 530 is executed by the coaching processor 508. For example, the coaching program 530 is executed after the display of the virtual scene 202 (FIG. 2) and before the display of the virtual scene 302 (FIG. 3) or after the display of the virtual scene 402 (FIG. 4).

It should be noted that the coaching program 530 performs the functions described herein as being performed by the coaching program 530 when the coaching program 530 is executed by the processor system 505. It should further be noted that in an embodiment instead of the game recorder 502, multiple game recorders are used. Similarly in one embodiment is that of the game processor 506, multiple game processors are used. In one embodiment instead of the coaching processor 508, multiple coaching processors are used.

In one embodiment, the game recorder 502, the game processor 506 and the coaching processor 508 are coupled with each other via a bus.

In an embodiment, the coaching program 530 is a portion of the game program 528 and is integrated into the game program 528. For example, a computer program code of the coaching program 520 is interspersed with a computer program code of the game program 528.

In one embodiment, a game event is sometimes referred to herein as a gameplay event.

In an embodiment, each time a death of the virtual user 102 occurs, the coaching program 530 identifies from the game event data 510, that the death has occurred. For example, the coaching program 530 determines that the virtual scene 202 includes the virtual drone 204 above the virtual user 204 to determine that the virtual user 102 has died. The coaching program 520 tags, such as assigns a keyword, such as death or demise, to the virtual scene 202 in which the virtual user 102 dies, and stores the keyword as metadata within one or more memory devices of the processor system 505. Each time the virtual user 102 dies, the coaching program 530 determines that a skill level of the user 1 is below a preset threshold, which is stored in one or more memory devices of the processor system 505. For example, each time the virtual user 102 dies in the game, the game program 528 reduces a skill level corresponding to the user ID1 to be below the preset threshold.

Figure 5B:
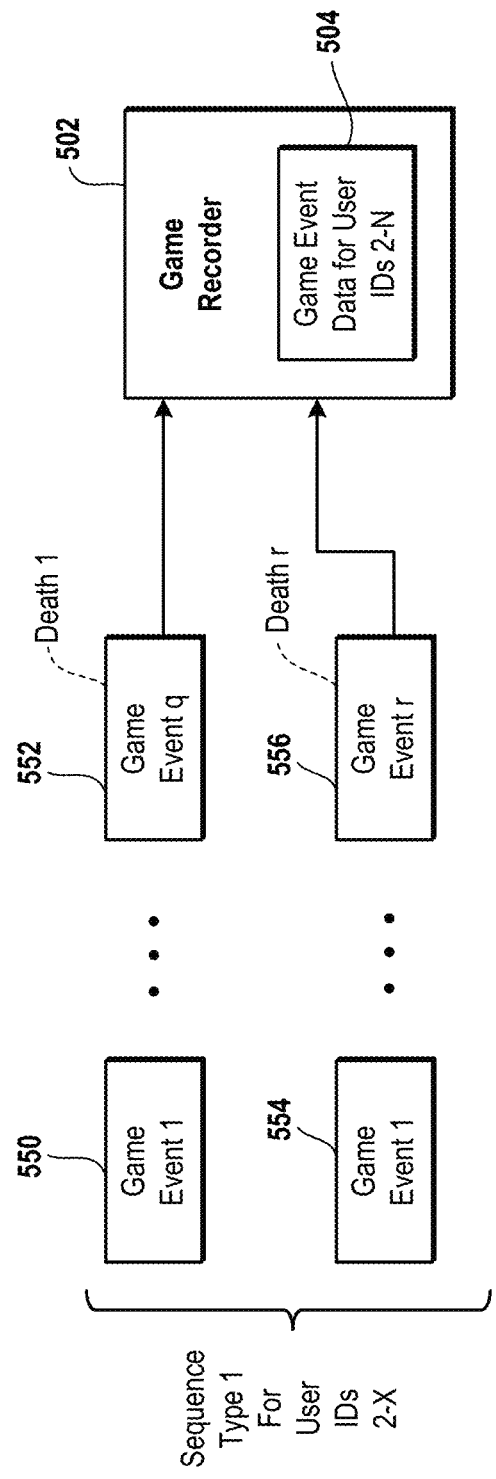
FIG. 5B is an embodiment of the game recorder to illustrate recording of game event data for user IDs 2 through N.

FIG. 5B is an embodiment of the game recorder 502 to illustrate recording of game event data 504 for user IDs 2 through N, where N is a positive integer. The user IDs 2 through N are assigned to other users 2 through N that are playing the game. For example, the user ID2 is assigned to a user 2 and the user IDN is assigned to a user N.

The game event data 504 includes a series of game events 1 through q for the user IDX and another series of game events 1 through r recorded for the user IDN. For example, a game event 550 includes data for a virtual scene that is accessed upon execution of the game program 528 (FIG. 5A). The game event q includes a death q of the virtual user 102. The game program 528 is accessed after the user IDN is authenticated by the processor system 505 (FIG. 5A). As another example, a game event 552 includes data for a virtual scene that is accessed upon execution of the game program 528. The game event 552 includes a death 1 of a virtual user that is controlled by the user N via a game controller N. As another example, a game event 554 includes data for a virtual scene that is accessed upon execution of the game program 528 and a game event 556 includes data for a virtual scene that is accessed upon execution of the game program 528. The game event 556 includes a death r of the virtual user that is controlled by the user N via the game controller N, where r is a positive integer. During or after execution of the game program 528, the game event data 504 that is recorded is provided from the game recorder 502 to the coaching processor 508 (FIG. 5A) in the same manner in which the game event data 510 (FIG. 5A) is provided from the game recorder 502 to the coaching processor 508.

FIG. 6 is a diagram of an embodiment of a system 600 to illustrate a use of the coaching program 530 to generate a coaching session 608 for training the user 1. The system 600 includes the game event data 510 for the user ID1. Also, the system 600 includes the coaching program 530, the game event data 504 for the user IDs 2-N, a client device 602, selected game event data 604, and metadata 606. Examples of a client device, as used herein, include a desktop computer, a laptop computer, a tablet, a smart phone, a combination of a hand-held remote controller and smart television, a combination of a hand-held controller (HHC) and a game console, and a combination of a hand-held controller and a head mounted display (HMD). A game controller is an example of the HHC. The display device 1 is an example of a display device of the client device 602.

The game event data 510 for the user ID1 includes video data 612 and audio data 614. As an example, video data of game event data includes a position, an orientation, and the graphics parameters of multiple virtual objects displayed in a virtual scene. Also, as an example, audio data of game event data includes phonemes, vocabulary, lyrics, or phrases that are uttered by one or more virtual objects in a virtual scene. Similarly, the game event data 504 for the user IDs 2-N includes video data and audio data for each of the user IDs 2-N.

Examples of the metadata 606 include game telemetry, such as one or more game states for generating virtual objects in the game. For example, the metadata 606 includes a game state based on which a virtual object, which is not displayed or output or uttered in a virtual scene, is displayed in a coaching scene. As another example, the metadata 606 is information associated with positions and orientations of one or more virtual objects in a virtual scene, such as the virtual scene 110 or 202 or 302 or 402 (FIGS. 1-4), that is displayed during execution of the game program 528. To illustrate, the metadata 606 is a position at which a virtual rectangular frame is displayed around a position of the virtual bullet 106 that is displayed in the virtual scene 110. The virtual rectangular frame is not displayed in the virtual scene 110. As another example, the metadata 606 is a position and orientation of a virtual user that is not displayed in the virtual scene 110 or 202 or 302 or 402 (FIGS. 1-4). The virtual user, not displayed, shoots the virtual bullet 106 (FIG. 1) or 306 (FIG. 3). The coaching program 530 generates the virtual user that shot the virtual user 102 at a position next to, e.g., to the right of, a position of the virtual bullet 106 to show the virtual user as shooting the virtual bullet 106 towards the virtual user 102. As yet another example, the metadata 606 is a username of the virtual user that is not displayed in the virtual scene 110 or 202 or 302 or 402 and that shoots a virtual bullet. As another example, the metadata 606 is not used to generate a camera view from view point of the virtual user that is not displayed in the virtual scene 110 or 202 or 302 or 402. For example, the metadata 606 is not used to generate an action replay of the virtual scene 110 or 202 or 302 or 402 from the viewpoint of the virtual user that is not displayed in the virtual scene 110 or 202 or 302 or 402.

Examples of the coaching session 608 includes a display of a coaching scene in which the user 1 cannot play the game but can learn based on his/her previous play of the game, or previous play of the game by the users 2-N, or a combination thereof. For example, the coaching program 530 is executed by the processor system 505 (FIG. 5A) to generate the coaching session 608 for the user ID1. An example of the coaching scene is a virtual scene that is generated and rendered upon execution of the coaching program 530. When the coaching session 608 is generated, one or more coaching scenes are displayed on the client device 602. The coaching scenes, when displayed for a user ID, do not allow a play of the game to the user ID. For example, during a display of the coaching scenes for the user ID1, the game program 528 (FIG. 5A) is not executed by the processor system 505 for the user ID1. To illustrate, for the user ID1, the processor system 505 does not render a virtual scene that is generated by executing the game program 528 during a display of one or more coaching scenes for the user ID1. Instead, the processor system 505 executes the coaching program 530 for rendering the one or more coaching scenes for the user ID1.

In an operation 610, the coaching program 530 receives an input signal 616 from the client device 602 to initiate the coaching session 608. For example, during a play of the game, the user 1 selects a button on the client device 1 to generate the input signal 616 for initiating the coaching session 608. To illustrate, after the virtual user 102 dies in the virtual scene 202 or 402 (FIG. 2 or 4), the user 1 selects a button of the game controller 1 (FIG. 1). Upon receiving the selection, the game controller 1 generates the input signal 616 for initiating the coaching session 608. The input signal 616 is sent from the client device 602 to the coaching program 530.

The coaching program 530 receives the input signal 616 and identifies from the input signal 616 that the coaching session 608 is to be initiated. Upon identifying to the coaching session 608 is to be initiated, the coaching program 530 generates an output signal 618 including a request 620 for one or more user IDs 622 for which the coaching program 520 is to be initiated. For example, the output signal 618 includes a query to the client device 602 for obtaining information regarding whether the coaching program 530 is to be initiated based on gameplay by the user ID1 or user ID2 or user IDN or a combination of two or more of the user IDs ID1, ID2, and IDN. To illustrate, the output signal 618 includes an inquiry for obtaining the user ID1 or user ID2 or the user IDN or a combination of two or more thereof that is accessed for gameplay of the game.

The client device 602 receives the request 620 for the one or more user IDs 622 from the coaching program 530. For example, the client device 602 displays the request 602 for the one or more user IDs 622 on a display screen of the client device 602. To illustrate, the client device 602 displays a list of the user IDs 1-N on the display screen of the client device 602. As another example, the client device 602 outputs a sound via a headphone worn by the user 1 asking the user 1 for the one or more user IDs 622. The headphone is a part of the client device 602 or is coupled to the client device 602. As yet another example, the client device 602 outputs a sound via one or more speakers of the client device 602 asking the user 1 for the one or more user IDs 622.

The client device 602 receives the one or more user IDs 622 from the user 1 and generates an input signal 623 that includes the one or more user IDs 622. For example, the user 1 selects one or more buttons on the game controller 1 to provide the one or more user IDs 622. To illustrate, the user 1 selects one or more buttons on the game controller 1 to select one or more of the user IDs 1-N displayed on the display screen of the client device 602. The client device 602 sends the input signal 623 to the coaching program 530.

Upon receiving the one or more user IDs 622 within the input signal 623, the coaching program 530 generates an output signal 624 including a request 626 for identifying a game sequence type for which the coaching session 608 is to be generated for the one or more user IDs 622. For example, the request 626 is an inquiry regarding whether the game sequence type is of a type 1 or a type 2. An example of type 1 of a game sequence includes multiple game events that lead to a death of a virtual user and an example of type 2 of a game sequence includes multiple game events that lead to a decrease in health level of the virtual user. To illustrate, the type 1 includes the game events 512 through 514 and the game events 516 and 518, and the type 2 includes the game events 520 through 522 and 524 through 526 (FIG. 5A).

The client device 602 receives the output signal 624 including the request 626 for identifying the game sequence type and outputs the request to the user 1 via a user interface or another type of interface of the client device 602. For example, the client device 602 displays or renders the request 626 via a display screen of the client device 602. To illustrate, the client device 602 displays a list of game sequence types including a death of the virtual user 102 (FIGS. 1-4) and a reduction in a health level of the virtual user 102 below the predetermined threshold. As another example, the client device 602 outputs a sound via one or more speakers of the client device 602 and the sound includes the request 626 for the game sequence type. As yet another example, the client device 602 outputs a sound via the headphone to the user 1 for obtaining a response to the request 626.

In response to the request 626, the user 1 provides a game sequence type identifier 628 via a user interface or another type of interface of the client device 602. For example, the user 1 selects one or more buttons of the game controller 1 to provide the game sequence type identifier 628. To illustrate, the user 1 selects one or more buttons to select either the game sequence type of death of the virtual user 102 or the reduction in the health level of the virtual user 102. Upon receiving the selection of the game sequence type identifier 628, the client device 602 generates an input signal 630 including the game sequence type identifier 628 and sends the input signal 630 to the coaching program 530.

The coaching program 530 receives the input signal 630 and identifies the game sequence type identifier 628 from the input signal 630. Upon identifying the game sequence identifier 628, the coaching program 530 generates an output signal 634 including a request 632 for identifying a game event of the sequence type identified by the game sequence identifier 628. For example, to determine whether the coaching session 608 is to be generated for the game event 514 or 518 (FIG. 5A) of death of the virtual user 102, the coaching program 530 generates the request 632 for identifying the game event 514 or 518. The coaching program 530 sends the output signal 634 to the client device 602.

Upon receiving the output signal 634, the client device 602 identifies the request 632 from the output signal 634 and provides the request 632 via a user interface or another interface of the client device 602 to the user 1. For example, the client device 602 displays a list of the game events 514 and 518 on the display screen of the client device 602. To illustrate, the client device 602 displays the virtual scene 202 and the virtual scene 402 on the display screen of the client device 602 to allow the user 1 to select one of the virtual scenes 202 and 402.

The user 1 responds to the request 632 to identify the game event for which the coaching session 608 is to be generated. The game event is identified to provide a game event identifier 636. For example, the user 1 selects via one or more buttons of the game controller 1, the virtual scene 202 to identify the game event 514 or the virtual scene 402 to identify the game event 518. In response to receiving the selection of the virtual scene 202 or 402, the client device 602 generates an input signal 638 having the game event identifier 636, and sends the input signal 638 to the coaching program 530.

Upon receiving the input signal 638, the coaching program 530 identifies the game event identifier 636 and selects the game event data 604 for which the coaching session 608 is to be generated for the game user ID 622. For example, the coaching program 530 identifies the game event identifier 636 identifying the game event 514 (FIG. 5A) recorded based on the virtual scene 202 (FIG. 2) that is displayed when the game program 528 is executed for the user ID1. An example of the selected game event data 604 includes the game event 514 or the game event 518 (FIG. 5A).

Upon identifying the game event identifier 636 for which the coaching session 608 is to be generated, the coaching program 530 is executed by the processor system 505 to store a portion of the game event data 510 that is recorded within a predetermined amount of time interval from a time of recording of the game event identified by the game event identifier 636 to output the selected game event data 604. For example, upon identifying the game event 514 for which the coaching session 608 is to be generated, the coaching program 530 stores one or more game events that are recorded within a predetermined time interval before a time at which the game event 514 is recorded. The coaching program 530 also stores the game event 514. The one or more game events lead up to or result in an occurrence of the game event 514. To illustrate, the coaching program 530 deletes from one or more memory devices of the processor system 505 one or more game events that are recorded outside the predetermined time interval before the time at which the game event 514 is recorded. The game event 514 and the game events within the predetermined time interval are stored by the coaching program 530 as the selected game event data 604. Also, in this illustration, the processor system 505 retains within the one or more memory devices of the processor system 505 one or more game events that are recorded within the predetermined time interval before the time at which the game event 514 is recorded to retain the selected game event data 604. The one or more game events that are deleted lead to the one or more game events that are retained, and the one or more game events that are retained lead to the game event 514. The one or more game events that are retained are the selected game event data 604.

To explain further, during a gaming session of the game, a series of virtual scenes are generated and recorded upon execution of the game program 528. The series includes a first series, a second series, and a third series. The first series includes a first set of consecutive virtual scenes in which the virtual user 102 collects items, such as virtual weapons and virtual objects, such as bricks or metal bars, to defend the virtual user 102 from virtual bullets. The second series includes a second set of consecutive virtual scenes in which the virtual user 102 fights with other virtual users. The third series includes a third set of consecutive virtual scenes, such as the virtual scenes 110 and 202 (FIGS. 1 and 2), for which the game events 512 and 514 (FIG. 5A) are recorded. The second series is consecutive to the first series and the third series is consecutive to the second series. The processor system 505 deletes the first and second series of virtual scenes and retains the third series of virtual scenes. The third series is the selected game event data 604.

As another illustration, the coaching program 530 stores the selected game event data 604, which includes a portion of the game event data 510, within one or more memory devices of the processor system 505. The one or more memory devices of the processor system 505 in which the selected game event data 604 is stored are different from, e.g., not the same as, one or more memory devices in which the game event data 510 is recorded. In one embodiment, instead of being stored at different one or more memory device, the selected game event data 604 is stored in a memory device at different memory addresses than memory addresses at which the game event data 510 is recorded in the memory device.

As yet another example, upon identifying the game event 514 for which the coaching session 608 is to be generated, the coaching program 530 stores one or more game events that are recorded within a predetermined time interval before a time at which the game event 514 is recorded, one or more game events recorded within a preset time interval after the time at which the game event 514 is recorded, and the game event 514. The one or more game events that are recorded within the predetermined time interval before the time at which the game event 514 is recorded, the game event 514, and the one or more game events recorded within the preset time interval after the time at which the game event 514 is recorded are the selected game event data 604. For example, upon identifying the game event 514 for which the coaching session 608 is to be generated, the coaching program 530 stores one or more game events that are recorded within the preset time interval after the time at which the game event 514 is recorded. The game event 514 is followed by the one or more game events recorded within the preset time interval after the time at which the game event 514 is recorded. To illustrate, the coaching program 530 deletes from one or more memory devices of the processor system 505 one or more game events that are recorded outside the preset time interval after the time at which the game event 514 is recorded. The one or more game events that occur within the preset time interval after the time at which the game event 514 is recorded lead to the one or more game events that are deleted. Also, in this illustration, the processor system 505 retains within the one or more memory devices of the processor system 505 one or more game events that are recorded within the preset time interval after the time at which the game event 514 is recorded.

To explain further, during a gaming session of the game, a series of virtual scenes are generated upon execution of the game program 528. The series includes a first series, a second series, and a third series. The first series includes a first set of consecutive virtual scenes in which the virtual user 102 collects items, such as virtual weapons and virtual objects, such as bricks or metal bars, to defend the virtual user 102 from virtual bullets after the virtual user 102 dies in the game event 514 as indicated in the virtual scene 202. The second series includes a second set of consecutive virtual scenes in which the virtual user 102 dances with other virtual users. The third series includes a third set of consecutive virtual scenes in which the virtual user 102 continues to dance with the other virtual users. The second series is consecutive to the first series and the third series is consecutive to the second series. The processor system 505 deletes the second and third series of virtual scenes and retains the first series of virtual scenes. The first series is the selected game event data 604.

Based on the selected game event data 604, the coaching program 530 processes the metadata 606 to generate and render virtual objects, such as overlays, that can increase game skills of the user 1 by enabling the user 1 to see one or more reasons for occurrence of the game event identified by the game event identifier 636. For example, the coaching program 530 processes the metadata 606 to identify a position and orientation of a virtual user that shot the virtual user 102 and determines to include an overlay of the virtual user that shot the virtual user 102. Once the overlay is displayed, the user 1 can see a reason for the death of the virtual user 102. The reason for the death is the virtual user that shot the virtual user 102. The overlay is an example of a virtual object. Also, the coaching program 530 generates a virtual frame surrounding the virtual user to highlight the virtual user. As another example, the coaching program 530 identifies, from the metadata 606, a position of the virtual bullet 106 and determines that the virtual user 102 would not have been killed by the virtual bullet 106 if the virtual user 102 would have jumped or been protected by a virtual wall. The coaching program 530 generates a coaching comment for displaying to the user 1 to control the virtual user 102 to jump while shooting or to build a wall around the virtual user 102. The coaching comment enables the user 1 to protect the virtual user 102 from being hit by the virtual bullet 106. The user 1 can review the coaching comment. When faced with a similar situation in which the virtual user 102 is about to be killed by another virtual bullet, if the user 1 follows the coaching comment, the virtual user 102 can be protected from the other virtual bullet.

The coaching program 530 generates overlays of virtual objects according to the metadata 606 for overlaying on the selected game event data 604 to generate the coaching session 608. For example, the coaching program 530 overlays a virtual frame around a virtual object in a virtual scene stored as the selected event data 604. As another example, the coaching program 530 overlays a virtual object in the virtual scene 202. The virtual object overlaid in the virtual scene 202 shot the virtual bullet 106 (FIG. 1). As yet another example, the coaching program 530 adds, as an overlay, a username or a user ID of the virtual object that shot the bullet 106.

The coaching program 530 provides the coaching session 608 to the client device 602. For example, the processor system 505 executes the coaching program 530 to generate one or more coaching scenes in which one or more virtual objects generated based on the metadata 606 are overlaid on the selected game event data 604. To illustrate, the one or more coaching scenes include an overlay of one or more virtual objects on the virtual scene 202. The one or more coaching scenes are displayed on the display screen of the client device 602.

The coaching session 608 continues until an input 640 is received from the client device 602. For example, the input 640 is generated when the user 1 selects one or more buttons on the game controller 1 to end the coaching session 608. The input 640 is sent within an input signal 642 to the coaching program 530. The coaching program 530 identifies the input 640 to end the coaching session 608 from the coaching program 530 and ends the coaching session 608. For example, the coaching program 530 ends the coaching session 530 for the user ID1 in response to the reception of the input 640. To illustrate, execution of the game program 528 for the user ID1 continues after the coaching session 608 ends for the user ID1.

In one embodiment, the coaching program 530 does not request the client device 602 for identifying a game sequence type and for identifying a game event of the game sequence type. For example, the coaching program 530 does not send the signals 624 and 634 to the client device 602. There is no need for the user 1 to identify a game sequence type and a game event of the game sequence type. Rather, the coaching program 530 determines that the input signal 616 for initiating the coaching session 608 is received immediately after the game event 514 or 518 of death of the virtual user 102. For example, the coaching program 530 determines that the input signal 616 is received at an end of occurrence of the game event 514 or 518 and before an occurrence of a game event consecutive to the game event 514 are 518. Upon determining so, the coaching program 530 determines that the coaching session 608 is to be generated for the game event 514 or 518.

In one embodiment, the coaching session 608 occurs during a play of the game. For example, both the coaching program 530 and the game program 528 are executed simultaneously by the processor system 505. Before the user 1 plays the game, an input signal indicating a selection for simultaneous execution of the coaching program 530 with the game program 528 is received from the game controller 1 of the client device 602 by the processor system 505. Upon receiving the input signal, the processor system 505 executes the coaching program 530. When the coaching program 530 is executed, one or more virtual objects are generated based on the metadata 606 and rendered by the coaching program 530 of the processor system 506 for display along with virtual objects of virtual scenes that are generated by execution of the game program 528. For example, one or more virtual objects generated based on the metadata 606 are displayed in the virtual scenes 110, 202, 302, and 402 during the coaching session 608.

In one embodiment, a coaching scene is referred to herein as a self-coaching interface, such as a self-coaching user interface.

Figure 7A:
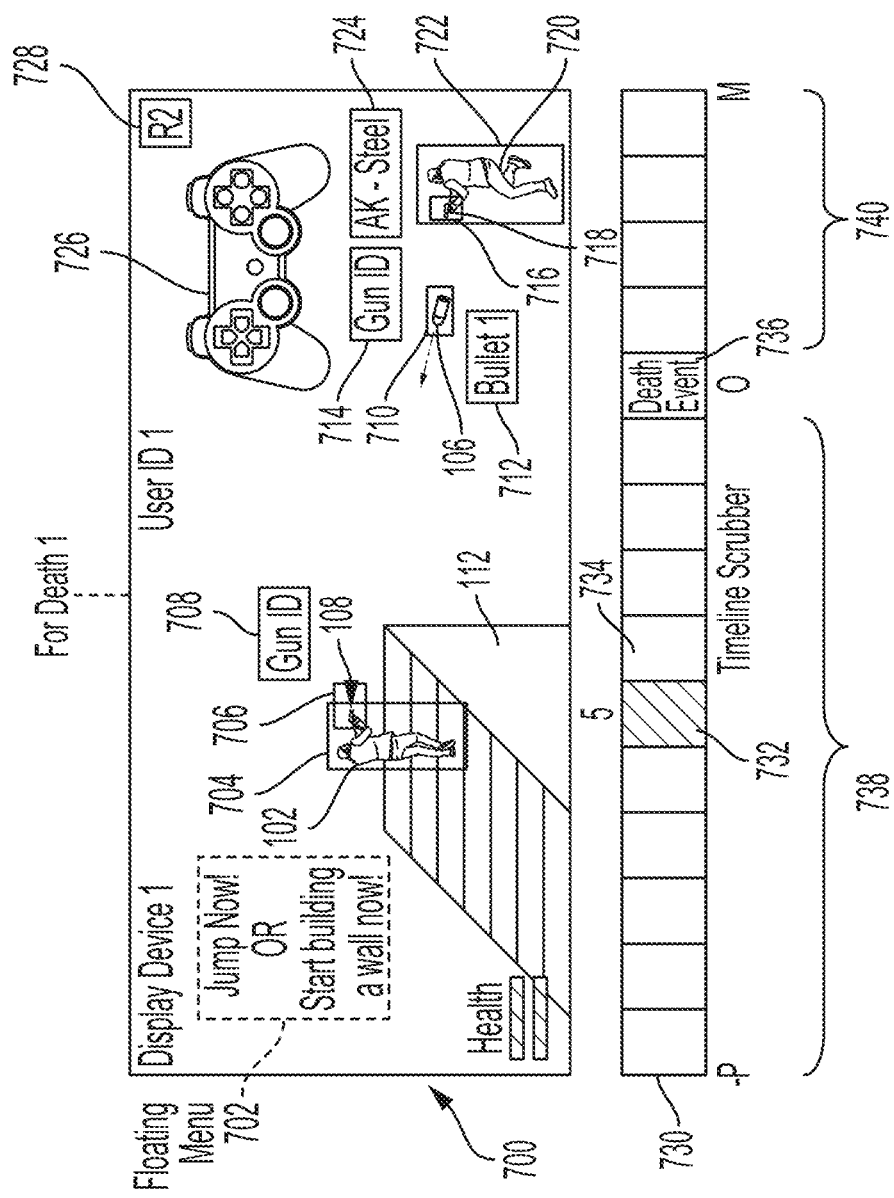
FIG. 7A is a diagram of an embodiment of a coaching scene for illustrating overlays of one or more virtual objects on one or more virtual objects of a virtual scene of FIG. 1.

FIG. 7A is a diagram of an embodiment of a coaching scene 700 for illustrating use of one or more virtual objects with the virtual scene 110 (FIG. 1). The one or more virtual objects are generated based on the metadata 606 (FIG. 6). The coaching scene 700 includes the virtual user 102, the virtual gun 108, the virtual bullet 106, and the virtual ramp 112. The coaching scene 700 is generated upon execution of the coaching program 530 (FIG. 6), and is displayed on the display device 1.

The coaching scene 700 includes a virtual comment 702, a virtual frame 704, another virtual frame 706, a gun ID 708, a virtual frame 710, a bullet ID 712, a gun ID 714, a virtual frame 716, a virtual gun 718, a virtual user 720, a virtual frame 722, a virtual user ID 724, a virtual game controller 726, and a virtual button ID 728. The coaching scene 700 excludes the virtual tree 105 and the virtual wall 107 so as to not clutter the coaching scene 700 with virtual objects unnecessary for coaching the user 1. The virtual comment 702, the virtual frame 704, the virtual frame 706, the gun ID 708, the virtual frame 710, the bullet ID 712, the gun ID 714, the virtual frame 716, the virtual gun 718, the virtual user 720, the virtual frame 722, the virtual user ID 724, the virtual game controller 726, and the virtual button ID 728 are examples of one or more virtual objects, such as overlays, generated based on the metadata 606. It should be noted that the virtual user 720 is not in the virtual scene 110 (FIG. 1A).

The virtual comment 702 is a coaching comment, "Jump Now! OR Start building a wall now!" for the user 1 to avoid being hit by the virtual bullet 106. The virtual frame 704 extends around the virtual user 102 to highlight the virtual user 102. Similarly, the virtual frame 706 extends around the virtual gun 108. The gun ID 708 identifies a type of the virtual gun 108 to highlight the virtual gun 108. For example, the gun ID 708 identifies whether the virtual gun 108 is a shotgun or a pistol or a semiautomatic gun or a double-barrel gun or an AK-47. The virtual frame 710 extends around the virtual bullet 106 to highlight the virtual bullet 106. The bullet ID 712 identifies a type of the virtual bullet 106. Examples of types of a virtual bullet include a lead round nose bullet, a semi-jacketed bullet, and a full metal jacket bullet.

The virtual frame 716 extends around the virtual gun 718 that is held by the virtual user 720. The gun ID 714 identifies a type of the virtual gun 718. The virtual frame 722 extends around the virtual user 720 to highlight the virtual user 720. The virtual user ID 724 is a user ID that is assigned to another user who controls the virtual user 720 that shot the virtual user 102 with the virtual bullet 106. The user ID 724 is assigned by the processor system 505 (FIG. 5A). The virtual game controller 726 is an image of the game controller 1 that is used or held by the user 1 playing the game and controlling the virtual user 102. The virtual button ID 728 is a button that is selected by the user 1 during an occurrence of the virtual scene 110 (FIG. 1) leading to a death of the virtual user 102. By providing the metadata 606 in the virtual scene 700, the coaching program 530 facilitates self-coaching of the user 1 to increase the skill level of the user 1.

The coaching scene 700 is displayed along or simultaneously with a timeline scrubber 730, which is a time bar or a time scale or a time axis or a timeline. The coaching program 530 generates and renders the time scrubber 730, which is a portion of the coaching session 608. The user 1 uses the game controller 1 to select one of many segments, such as segments 732, 734, and 736, of the timeline scrubber 732 to access the coaching scene 700 from the processor system 505 and view the coaching scene 700. For example, when the segment 732 is selected, the coaching scene 700 is displayed on the display device 1.

The timeline scrubber 730 includes segments for displaying the selected game event data 604 on the display screen 1. As an example, the timeline scrubber 730 includes segments and each segment can be selected by the user 1 via the game controller 1 to generate an input signal. When the input signals are received, a playback of the virtual scenes leading up to a game event, a virtual scene of the game event, and virtual scenes occurring after the game event are played back by the coaching program 530 with overlay content superimposed on one or more of the virtual scenes. As another example, the timeline scrubber 730 includes a set 738 of segments that can be selected by the user 1 via the game controller 1 to enable a display of coaching scenes in which one or more virtual objects generated based on the metadata 606 are overlaid on portions of virtual scenes that are recorded during the predetermined time period before the time at which a virtual scene, such as the virtual scene 202, of death of the virtual user 102 is recorded. The predetermined time period extends from −P time units to 0 time units, where time units can be seconds or minutes. Moreover, the timeline scrubber 730 includes a segment 736 that can be selected by the user 1 via the game controller 1 to view a coaching scene in which one or more virtual objects generated based on the metadata 606 are overlaid on a portion of a virtual scene, such as the virtual scene 202, that is recorded at a time of death of the virtual user 102. When the segment 736 of the timeline scrubber 730 is selected by the user 1 via the game controller 1, the coaching scene including one or more virtual objects generated based on the metadata 606 are overlaid on one or more of the virtual objects in the virtual scene 202 in which the virtual user 102 died is rendered by the coaching program 530 and displayed on the display device 1. The death of the virtual user 102 is recorded at 0 units. The timeline scrubber 730 includes a set 740 of segments that can be selected by the user 1 via the game controller 1 to enable a display of coaching scenes in which one or more virtual objects generated based on the metadata 606 are overlaid on portions of virtual scenes that are recorded during the preset time period after the time at which a virtual scene, such as the virtual scene 202, of death of the virtual user 102 is recorded. The preset time period extends from 0 time units to M time units, where time units can be seconds or minutes. There is a window of time between the time units −P and M.

In one embodiment, the coaching scene 700 excludes one or more of the virtual frame 704, the virtual frame 706, and the gun ID 708. For example, the coaching program 530 determines that one or more of the virtual frame 704, the virtual frame 706, and the gun ID 708 is not needed to increase the skill level of the user 1, and therefore does not generate one or more of the virtual frame 704, the virtual frame 706, and the gun ID 708.

In an embodiment, instead of extending a frame around a virtual object in a coaching scene, the coaching program 530 highlights the virtual object by rendering the virtual object in a substantially different color or intensity or shade compared to colors or intensities are shades of other virtual objects in the coaching scene. For example, instead of extending the frame 710 around the virtual bullet 106 and the frame 722 around the virtual user 720, the coaching program 530 renders the virtual bullet 106 and the virtual user 720 to have a substantially greater intensity than intensities of the virtual user 102 and the virtual gun 108. Again, highlighting the virtual bullet 106 and the virtual user 720 in comparison with the virtual user 102 and the virtual gun 108 facilitates self-coaching of the user 1.

In an embodiment, the coaching scene 700 includes the virtual tree 105 and the virtual wall 107.

In one embodiment, the coaching program 530 changes a time period between the time units −P and M based on a number of game events that lead up to an end game event, such as death or decrease in health level. For example, the coaching program 520 determines that a first length of time for which the virtual user 102 engages in a battle sequence that leads to a first death of the virtual user 102 is greater than a second length of time for which the virtual user 102 engages in a second battle sequence that leads to a second death of the virtual user 102. The first battle sequence is fought with one or more virtual users and the second battle sequence is fought with one or more virtual users. The coaching program 520 stores the selected game event data 604 that leads up to the first death for the first length of time and stores the selected game event data 604 that leads up to the second death for the second length of time. In this manner, the entire first and second battle sequences are captured and stored by the coaching program 520.

Figure 7B:
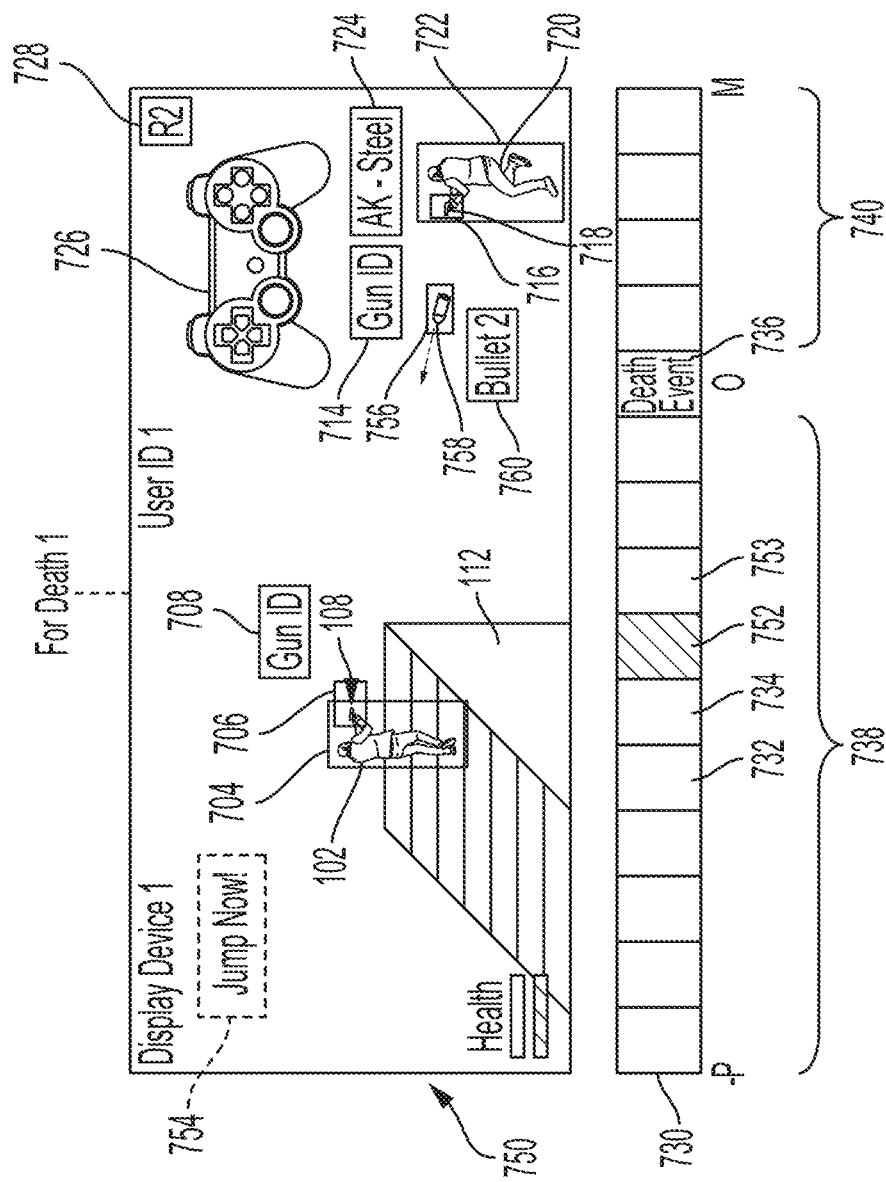
FIG. 7B is a diagram of an embodiment of a coaching scene that is rendered and displayed on a display device of the system of FIG. 1.

FIG. 7B is a diagram of an embodiment of a coaching scene 750 that is rendered and displayed on the display device 1. The coaching scene 750 is rendered by the coaching scene 750 in response to an input signal indicating a selection of a segment 752 on the timeline scrubber 730. The segment 752 is selected by the user 1 using one or more buttons on the game controller 1.

The segment 752 is consecutive to the segment 734 and the segment 734 is consecutive to the segment 732. For example, the segment 752 includes one or more virtual objects from a virtual scene that is recorded between a time at which the virtual scene 110 (FIG. 1) is recorded and a time at which the virtual scene 202 (FIG. 2) is recorded. Each virtual scene corresponding to a segment of the timeline scrubber 730 is recorded after being displayed on the display screen 1.

The coaching scene 750 includes a virtual comment 754, a virtual frame 756, a virtual bullet 758, and a bullet ID 760. The virtual comment 754 is generated by the coaching program 530 (FIG. 6) to coach the user 1 to protect the virtual user 102 from being shot by the virtual bullet 758. For example, the virtual comment 754 includes "Jump Now!". The virtual frame 756 extends around or surrounds the virtual bullet 758 that is shot by the virtual user 720 after the virtual bullet 106 (FIG. 7A) is shot. The virtual frame 756 highlights the virtual bullet 758. The bullet ID 760 identifies a type of the virtual bullet 758. The coaching scene 750 excludes the virtual tree 105 and the virtual wall 107 so as to not clutter the coaching scene 750 with virtual objects unnecessary for coaching the user 1.

It should be noted that in the coaching scene 750, a progression of virtual objects compared to the virtual objects in the coaching scene 700 of FIG. 7A is illustrated. For example, in the coaching scene 750, the virtual frame 756 that surrounds the virtual bullet 758 shot from the virtual gun 718 is illustrated. The virtual frame 756 is generated after the virtual frame 710 that surrounds the virtual bullet 106 is generated. The virtual bullet 758 is shot after the virtual bullet 106 is shot. Also, in the coaching scene 750, the virtual comment 754 indicates to the user 1 to control the virtual user 102 to jump without an option for building a virtual wall. The coaching program 530 determines that at the time the virtual bullet 758 is shot, it is too late for the user 1 to build the virtual wall.

In one embodiment, when a segment 753 next to the segment 752 is selected by the user 1 via the game controller 1, the processor system 505 processes the metadata 606 to display a position of the virtual bullet 758 that is closer to the virtual user 102 compared to a position of the virtual bullet 758 illustrated in the coaching scene 750. The segment 753 corresponds to a coaching scene that includes one or more virtual objects from a first virtual scene that is consecutive in time from a time at which a second virtual scene is recorded by the game recorder 502. The positions of the virtual bullet 758 in the first and second virtual scenes define movement of the virtual bullet 758. The coaching scene 750 includes virtual objects from a playback of the second virtual scene.

In an embodiment, the coaching scene 750 includes the virtual tree 105 and the virtual wall 107.

In one embodiment, the virtual comments 702 and 754 are examples of hints to the user 1 to increase the skill level to be above the preset threshold. For example, during a next gaming session, when the user 1 controls the virtual user 102 or build a virtual wall on at least one side of the virtual user 102, chances of the virtual user 102 from being hit by a virtual bullet from a side or behind the virtual user 102 are reduced. The virtual user 102 can stay alive longer during the game session and the game program 528 increases the skill level of the user 1 to be above the preset threshold. Each hint provides a reason for a death of the virtual user 102. For example, the virtual user 102 died during a previous gaming session because the virtual user 102 did not build a virtual wall or did not jump during the previous gaming session.

Figure 8A:
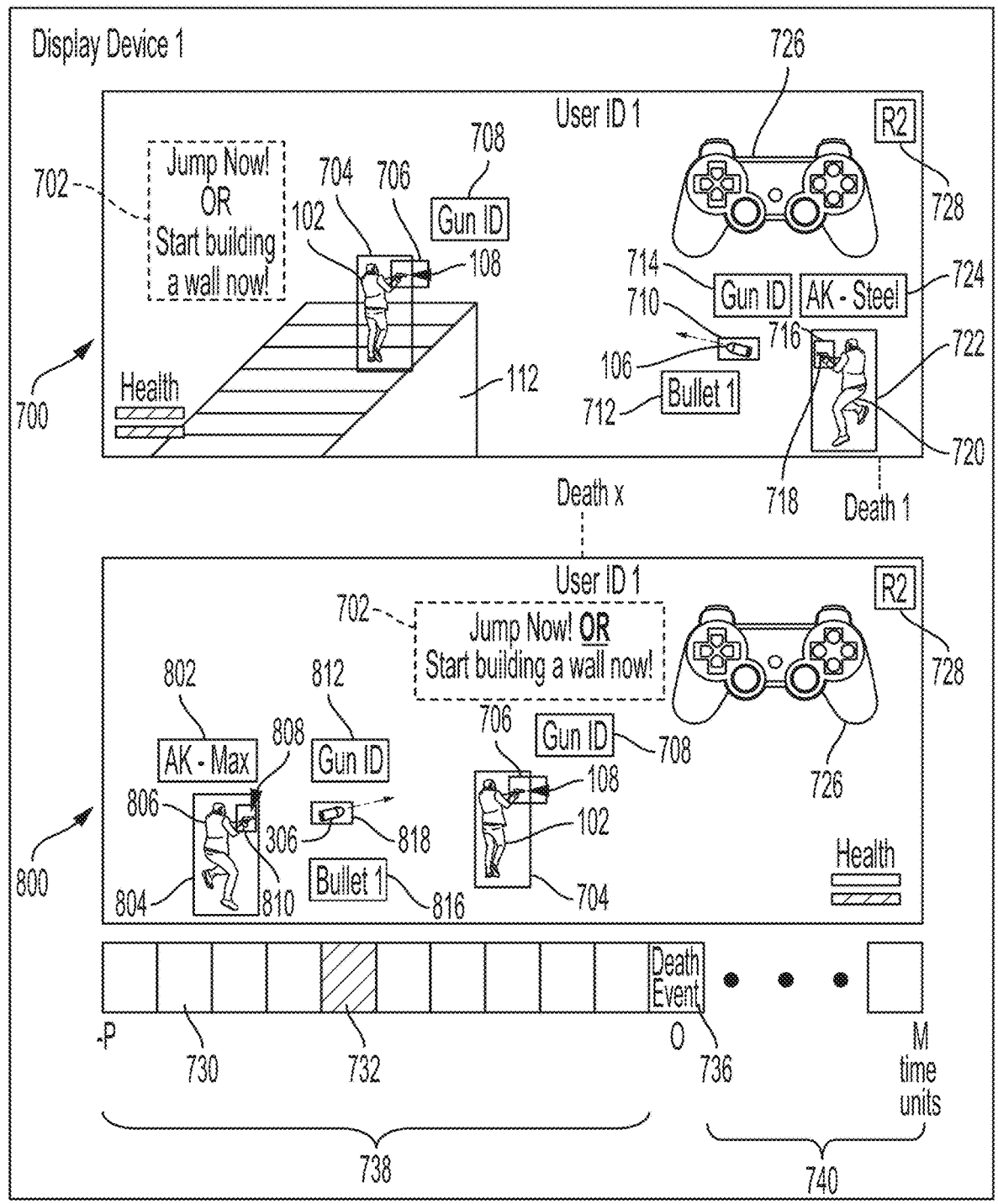
FIG. 8A is a diagram of an embodiment to illustrate a simultaneous display of the coaching scene of FIG. 7A and another coaching scene on the display device of FIG. 1.

FIG. 8A is a diagram of an embodiment to illustrate a simultaneous display of the coaching scene 700 and another coaching scene 800 on the display device 1. In addition to the coaching scene 700, the coaching scene 800 is rendered by the coaching program 530 (FIG. 6) on the display device 1. For example, the coaching session 608 (FIG. 6) includes the coaching scenes 700 and 800. As another example, an input signal is received by the coaching program 530 from the client device 602. The input signal indicates a selection of the game event identifier 636 (FIG. 6) of game event data recorded from the virtual scene 110 (FIG. 1) based on which the coaching scene 700 is generated and a selection of another game event identifier of game event data recorded from which the virtual scene 302 (FIG. 3) based on which the coaching scene 800 is generated. In this example, when a selection of the segment 732 on the timeline scrubber 730 is received from the client device 602, both the coaching scenes 700 and 800 are generated and rendered by the coaching program 530. Also in this example, the timeline scrubber 730 is generated by the coaching program 530 and rendered along the coaching scenes 700 and 800.

The coaching scene 800 is generated based on the virtual scene 302 (FIG. 3). For example, the virtual scene 302 is recorded and one or more virtual objects from the virtual scene 302 are included in the coaching scene 800. To illustrate, the virtual user 102, the virtual bullet 306, and the virtual gun 108 are included in the coaching scene 800. As another example, the coaching scene 800 is generated based on the virtual scene 302 that is displayed and recorded at a time corresponding to the segment 732. To illustrate, the virtual scene 302 is recorded a number of time segments prior to a time of the game event q of the virtual user 102. The virtual scene 302 is recorded in the same manner as that of the virtual scene 110 from which the coaching scene 700 is generated.

The coaching scene 800 includes a user ID 802, a virtual frame 804, a virtual user 806, a virtual gun 808, a virtual frame 810, a gun ID 812, the virtual bullet 306, a bullet ID 816, and a virtual frame 818. The user ID 802, the virtual frame 804, the virtual user 806, the virtual gun 808, the virtual frame 810, the gun ID 812, the bullet ID 816, and the virtual frame 818 are examples of one or more overlays of virtual objects generated based on the metadata 606 (FIG. 6).

The virtual frame 804 extends around the virtual user 806 to highlight the virtual user 806 that is a reason for the death x of the virtual user 102. The virtual user 806 is controlled by another user via a game controller. The virtual frame 810 extends around the virtual gun 808 held by the virtual user 806 to highlight the virtual gun 808. The gun ID 812 identifies a type of the virtual gun 808. The user ID 802 is assigned to the other user that controls the virtual user 806. The user ID 802 is assigned by the processor system 505 (FIG. 5A).

The virtual frame 818 extends around the virtual bullet 306 to highlight the virtual bullet 306 that is directed towards the virtual user 102 by the virtual user 806. The bullet ID 816 identifies the virtual bullet 306. Also, the coaching scene 800 includes the virtual comment 702 to facilitate coaching of the user 1.

In one embodiment, a virtual comment displayed within the coaching scene 800 is different from the virtual comment 702. For example, the virtual comment displayed within the coaching scene 800 is "Jump!" or "Build a wall" instead of "Jump now! OR Start building a wall now!".

In an embodiment, one or more virtual objects in the coaching scene 800 are not highlighted by the coaching program 530. For example, the coaching program 530 determines that there is no need for highlighting the virtual user 102 and the virtual gun 108 to increase the skill level of the user 1, and determines not to generate the virtual frame 704 and the virtual frame 706.

Figure 8B:
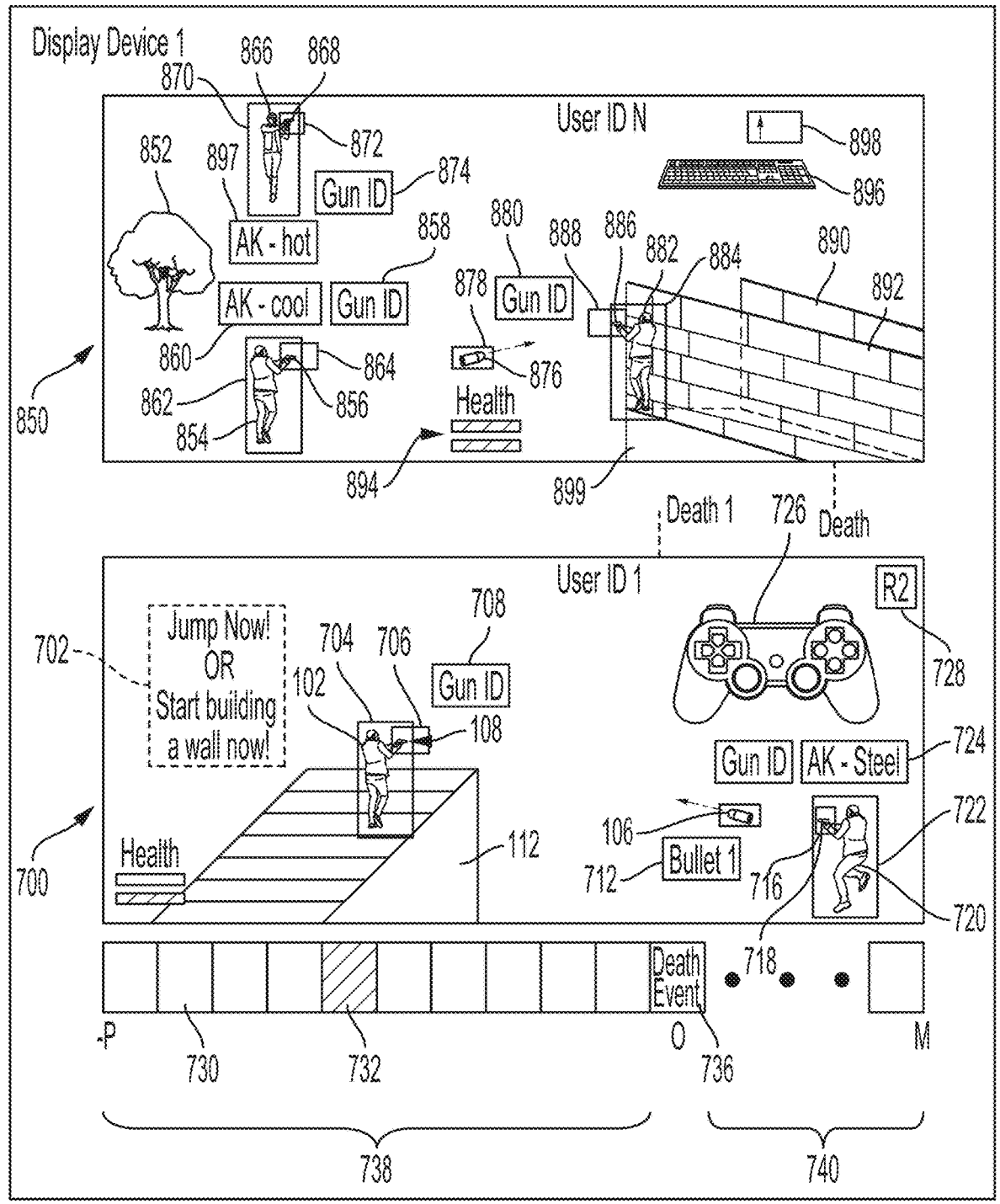
FIG. 8B is a diagram of an embodiment of the display device of FIG. 1 to illustrate a simultaneous rendering and display of the coaching scene of FIG. 7 associated with the user ID1 and another coaching scene associated with the user ID N.

FIG. 8B is a diagram of an embodiment of the display device 1 to illustrate a simultaneous rendering and display of the coaching scene 700 associated with the user ID1 and another coaching scene 850 associated with the user ID N. The coaching scene 850 is generated by the coaching program 530 (FIG. 5A). The coaching scene 850 is generated for the user ID N. For example, when the input signal 623 (FIG. 6) includes the user ID1 identifying the user 1 and includes the user ID N identifying another user who is assigned a user ID N, the coaching program 530 accesses the game event data 504 recorded for the user ID N from one or more memory devices of the processor system 505 and stores a portion of the game event data 504 as a portion of the selected game event data 604 in one or more memory devices of the processor system 505. To illustrate, the one or more memory devices in which the game event data 504 is recorded are different than the one or more memory devices in which the selected game event data 604 is recorded. The one or more virtual objects generated based on the metadata 606 for the user ID N are overlaid by the coaching program 530 on the portion of the selected game event data 604 for the user ID N to generate the coaching scene 850 for the user ID N. The game event data 504 is generated during game play of the game by the other user having the user ID N.

The coaching scene 850 includes a virtual tree 852, a virtual user 854, a virtual gun 856, a gun ID 858, a user ID 860, a virtual frame 862, another virtual frame 864, a virtual user 866, a virtual gun 868, a virtual frame 870, another virtual frame 872, a gun ID 874, a virtual bullet 876, a virtual frame 878, a gun ID 880, a virtual user 882, a virtual frame 884, a virtual gun 886, a virtual frame 888, a virtual wall 890, another virtual wall 892, a virtual health 894, a user ID 897, and a virtual ramp 899. The coaching scene 850 further includes a virtual controller 896, and a virtual button 898. The user ID 860, the virtual frame 862, the virtual frame 864, the virtual user 854, the virtual gun 856, the gun ID 858, the virtual frame 872, the gun ID 874, the virtual frame 888, the virtual frame 884, the virtual frame 870, the virtual controller 896, and the virtual button 898 are examples of one or more virtual objects generated based on the metadata 606 for overlay.

The coaching scene 850 is generated for the user ID N based on a virtual scene that is generated upon execution of the game program 528 (FIG. 5A), and leads up to a death of the virtual user 882. For example, the virtual scene from which the coaching scene 850 is generated includes one or more of virtual objects displayed in the coaching scene 850. The virtual scene from which the coaching scene 850 is generated excludes one or more virtual objects generated based on the metadata 606 for display in the coaching scene 850. To illustrate, the virtual scene from which the coaching scene 850 is generated includes the virtual bullet 876, the virtual gun 886, the virtual user 882, the virtual ramp 899, the virtual walls 890 and 892, the virtual tree 852, the user ID 897, the virtual user 866, and the virtual gun 868. The virtual scene for the user ID N is generated after the other user accesses the game program 528. The game program 528 is accessed by the other user when the user ID N is authenticated by the processor system 505.

The virtual frame 862 surrounds the virtual user 854 and the virtual frame 864 surrounds the virtual gun 856. The gun ID 858 identifies a type of the virtual gun 856. The user ID 860 is assigned to a user that controls the virtual user 854 via a game controller or another type of controller. The virtual frame 878 extends around the virtual bullet 876 that is shot from the virtual gun 856 towards the virtual user 882.

The virtual health 894 is a health of the virtual user 882. The virtual frame 884 extends around the virtual user 882 and the virtual frame 888 extends around the virtual gun 886. The virtual user 882 is standing on the virtual ramp 899 and is surrounded on two sides by the virtual walls 890 and 892. The gun ID 880 identifies a type of the virtual gun 886. Also, the gun ID 874 identifies a type of the virtual gun 868. The virtual frame 872 surrounds the virtual gun 868 and the virtual frame 870 surrounds the virtual user 866. The user ID 897 identifies a user who is controlling the virtual user 866 via a game controller or another type of controller.

The virtual controller 896 is an image of a controller, such as a keyboard, that is used by the other user to control the virtual user 882. The virtual button 898 identifies a button on the controller that is represented by the virtual controller 896. The button is selected by the other user at the time corresponding to the segment 732 during the play of the game.

The timeline scrubber 730 is displayed along or simultaneous with a display of the coaching scenes 700 and 850. For example, the coaching program 530 (FIG. 6) renders the timeline scrubber 730 along with the simultaneous display of the coaching scenes 700 and 850, for display of the timeline scrubber 730 with the coaching scenes 700 and 850. When a selection of the segment 732 is received from the game controller 1 (FIG. 1) of the client device 602 (FIG. 6), the coaching program 530 renders the coaching scene 850, which is generated based on a virtual scene that is recorded at a time corresponding to the segment 732. The segment 736 indicates the time 0 at which a death of the virtual user 882 occurs during a play of the game by the other user that controls the virtual user 882.

The virtual user 882 is shooting at the virtual user 866. During the shootout, the virtual user 854 is shooting at the virtual user 882. The virtual wall 892 protects the virtual user 882 from being injured by the virtual bullet 876. The user 1 can learn from the coaching scene 850 to build a virtual wall, such as the virtual wall 890, on a side of the virtual user 102 to protect the virtual user 102 from the virtual bullet 106 shot by the virtual user 720.

In one embodiment, instead of the coaching program 530, a coaching engine is used. As an example, an engine is a combination of software and hardware for executing functions described herein as being performed by the engine. To illustrate, the engine is a PLD or an ASIC that is programmed to perform the functions described herein as being performed by the engine.

In one embodiment, any virtual frame, described herein, surrounds a virtual object to highlight the virtual object.

Figure 8C:
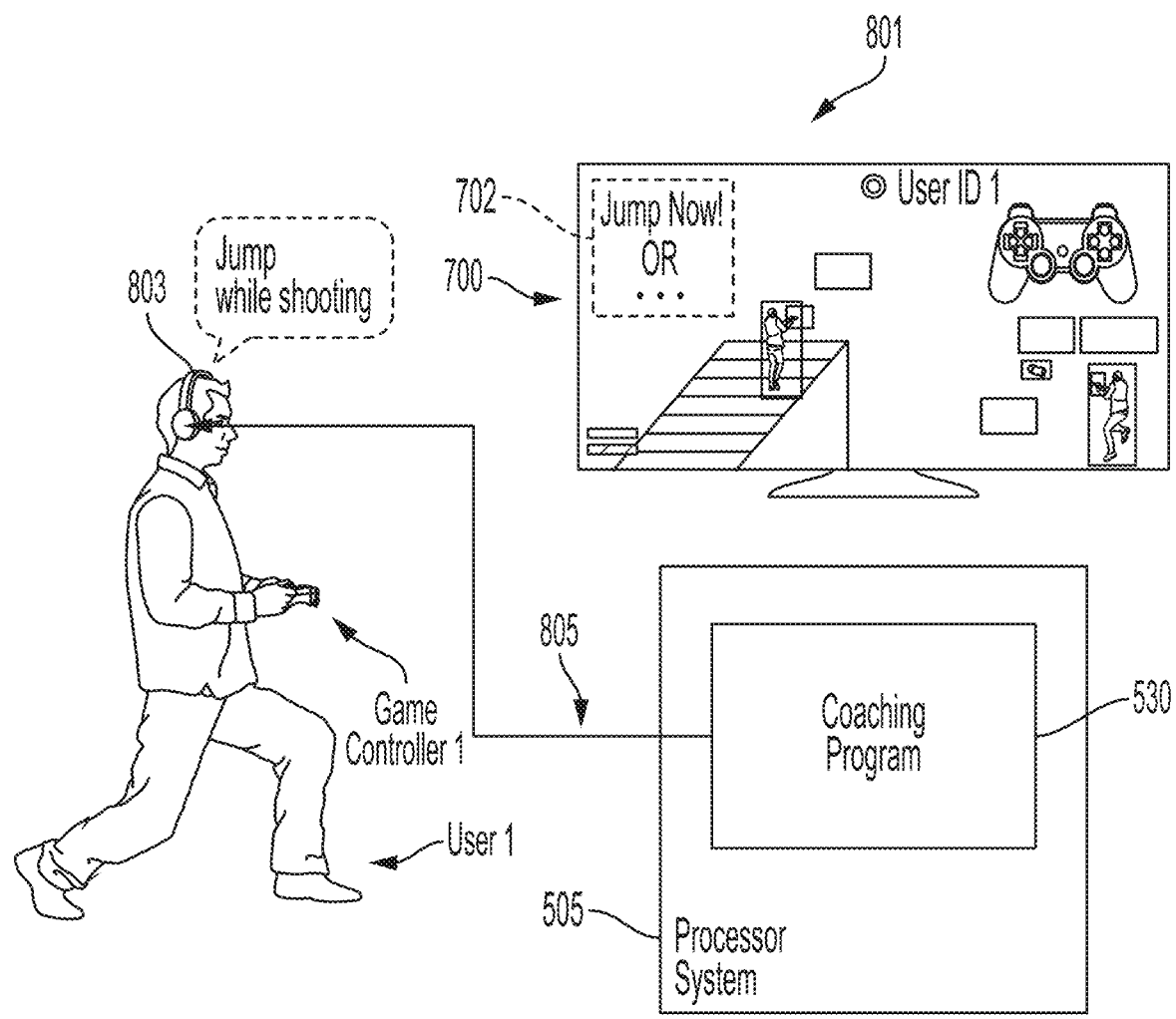
FIG. 8C is a diagram of an embodiment of a system to illustrate that instead of or in addition to rendering a coaching scene on a display screen, a processor generates audio data that is output as sound to a user via a head phone.

FIG. 8C is a diagram of an embodiment of a system 801 to illustrate that instead of or in addition to rendering a coaching scene on the display screen 1, the processor system 505 generates audio data 805 that is output as sound to the user 1 via a head phone 803. The head phone 803 is worn to by the user 1 to be proximate to ears of the user 1. During the coaching session 608, the coaching program 530 generates the audio data 805 that is output as sound to the user 1. For example, during the coaching session 608, instead of or in addition to displaying the virtual comment 702, the coaching program 530 sends the audio data 805 to the headphone 803. The audio data 805 includes a message, such as "Jump while shooting", that is output as sound simultaneously with or instead of the virtual comment 702 displayed on the display screen 1. The headphone 803 outputs the audio data 805 as the message to the user 1.

In an embodiment, the virtual objects 702, 704, 706, 708, 710, 712, 714, 716, 718, 720, 722, 724, 726, 728 (FIG. 7A), 756, 758 (FIG. 7B), 802, 804, 806, 808, 810, 812, 816, 818 (FIG. 8A), 854, 856, 858, 860, 864, 878, 880, 884, 888, 870, 872, 874, and 897 are examples of overlay content that is generated by the coaching program 530 based on the metadata 606.

Figure 9:
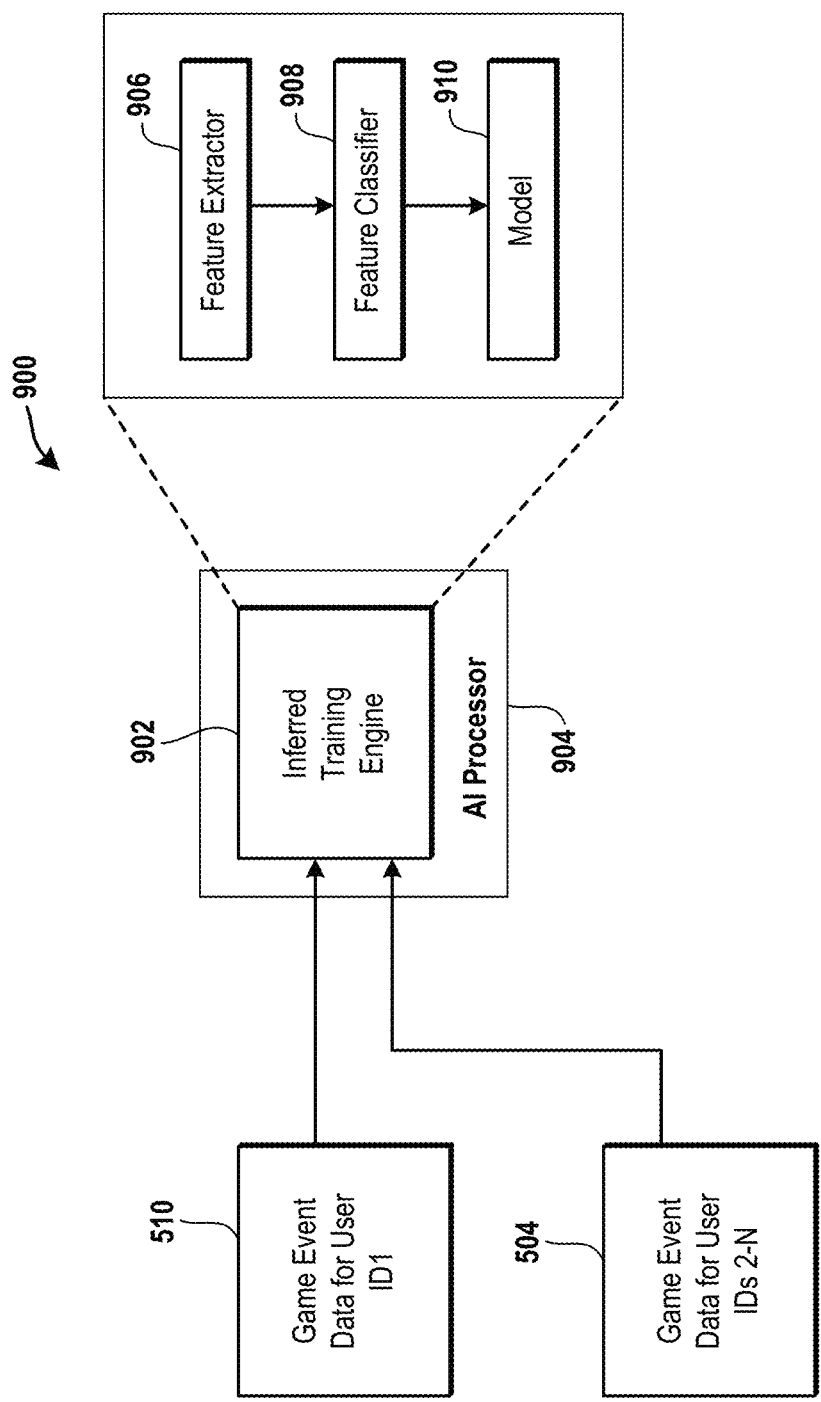
FIG. 9 is a diagram of an embodiment of a system to illustrate use of an inferred training engine for generating the coaching session of FIG. 6.

FIG. 9 is a diagram of an embodiment of a system 900 to illustrate use of an inferred training engine 902 for generating the coaching session 608 (FIG. 6). The system 900 includes an artificial intelligence (AI) processor 904, the game event data 510 for the user ID1, and the game event data 504 for the user IDs 2-N. The AI processor 904 is a processor of the processor system 505 (FIG. 5A).

The inferred training engine 902 includes a feature extractor 906, a feature classifier 908, and a model 910 that is to be trained. An example of each of the feature extractor 906, the feature classifier 908, and the model 910 is an ASIC. Another example of each of the feature extractor 906, the feature classifier 908, and the model 910 is a PLD. An example of the model 910 is a network of circuit elements. Each circuit element has one or more inputs and one or more outputs. An input of a circuit element is coupled to one or more outputs of one or more circuit elements. To illustrate, the model 910 is a neural network or an artificial intelligence model. The feature classifier 908 is coupled to the feature extractor 906 and to the model 910.

The inferred training engine 902 accesses, such as reads, the game event data 510 and the game event data 504 from one or more memory devices of the game recorder 502. The feature extractor 906 extracts features from the game event data 510 and 504. Once the features are extracted, the feature classifier 908 classifies the features that are extracted. The features that are classified are used to train the model 910 to determine a game event, such as death or decrease in health level, for which to initiate the coaching session 608 and to identify one or more virtual objects of a virtual scene that are to be associated with one or more overlays of virtual objects generated based on the metadata 606.

Figure 10:
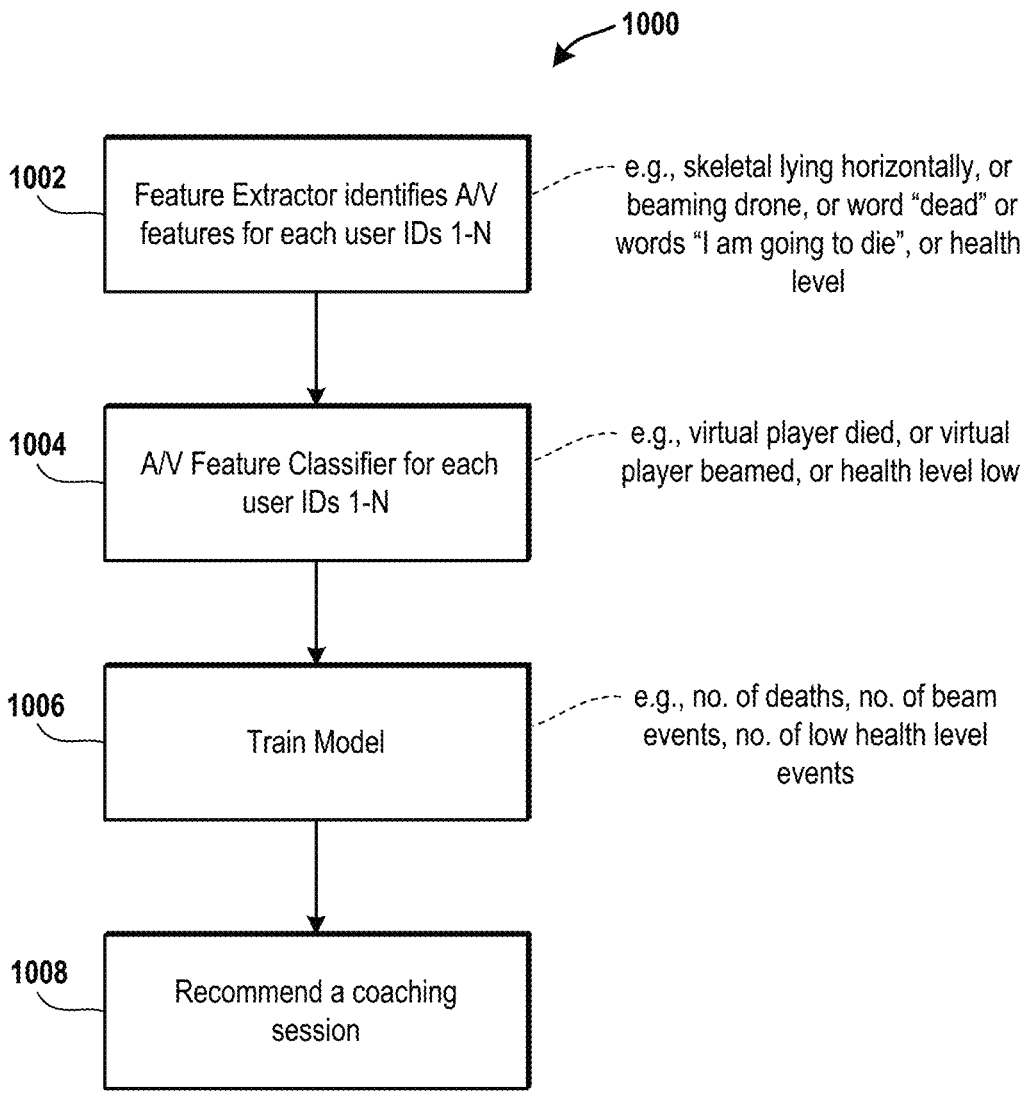
FIG. 10 is a flowchart to illustrate an embodiment of a method for training a model.

FIG. 10 is a flowchart to illustrate an embodiment of a method 1000 for training the model 910. In an operation 1002 of the method 1000, the feature extractor 906 identifies features from the game event data 510 and the game event data 504 (FIG. 9). For example, the feature extractor 906 determines that a skeletal of the virtual user 102 in the virtual scene 202 (FIG. 2) lies in a horizontal plane instead of a vertical plane, or determines that the virtual scene 202 includes the virtual drone 204 above the skeletal of the virtual user 102 for beaming the virtual user 102, or determines that words, such as, "I am going to die" or "I am dead" are uttered by the virtual user 102 in the virtual scene 202, or a combination thereof to determine a death of the virtual user 102 in the virtual scene 202. As another example, the feature extractor 906 determines that a health level of the virtual health of the virtual user 102 in the virtual scene 202 has decreased to zero to determine that the health level has decreased to be below the predetermined threshold.

An operation 1004 of the method 1000 occurs after the operation 1002. In the operation 1004, the feature classifier 908 classifies the features extracted from the game event data 510 and 504. For example, the feature classifier 908 determines that because the skeletal of the virtual user 102 lies in the horizontal plane, the virtual user 102 has died. As another example, the feature classifier 908 determines that because the virtual scene 202 includes the virtual drone 204 above the skeletal of the virtual user 102, the virtual user 102 has died. As yet another example, the feature classifier 908 determines that because the virtual scene 202 includes the word "I" and "dead" or "I" and "die" in the same sentence uttered by the virtual user 102 in the virtual scene 202, the virtual user 102 has died. As another example, the feature classifier 908 determines that because the health level of the virtual user 102 in the virtual scene 202 has decreased to be below the predetermined threshold, health of the virtual user 102 is low.

An operation 1006 of the method 1000 occurs after the operation 1004. In the operation 1006, the model 910 is trained based on a number of game events of a sequence type to determine a probability of occurrence of a game event of the sequence type during a next gaming session. For example, the model 910 determines a probability that the virtual user 102 will die during a next gaming session or a probability that a health level of the virtual user 102 will decrease below the threshold during a next gaming session. To illustrate, upon determining that the virtual user 102 has died during at least 6 out of the past 10 gaming sessions, the model 910 determines that a probability that the virtual user 102 will die during a next gaming session is high, e.g., above a preset threshold. On the other hand, upon determining that the virtual user 102 has survived during at least 6 out of the past 10 gaming sessions, the model 910 determines that a probability that the virtual user 102 will die during a next gaming session is low, e.g., below the preset threshold.

An operation 1008 of the method 1000 follows the operation 1006. The operation 1008 is executed by the processor system 505. Upon determining that the probability of occurrence of a game event of a sequence type during the next gaming session is low, the processor system 505 does not recommend, in the operation 1008, that the coaching session 608 be initiated for the next gaming session. On the other hand, upon determining that the probability of occurrence of a game event of a sequence type during the next gaming session is high, the processor system 505 recommends, in the operation 1008, that the coaching session 608 be initiated for the next gaming session. For example, the processor system 505 generates a message and renders the message for display on the display device 1. The message queries the user 1 whether the user 1 wishes to initiate the coaching session 608. As another example, the processor system 505 generates audio data including the message to indicate to the user 1 whether the user 1 wishes to initiate the coaching session 608, and sends the audio data to the head phone 910 (FIG. 9). The audio data is output as sound by the head phone 910 to the user 1.

Upon viewing the message displayed on the display screen 1 or listening to the message, which is output as sound by the head phone 910, the user 1 selects one or more buttons on the game controller 1 to indicate that the coaching session 608 be initiated to generate an input signal. Upon receiving the input signal indicating that the coaching session 608 be initiated, the processor system 505 initiates the coaching session 608. For example, the processor system 505 renders the coaching scene 700 (FIG. 7A) or the coaching scene 750 (FIG. 7B) or both the coaching scenes 700 and 800 (FIG. 8A) or both the coaching scenes 700 and 850 (FIG. 8B) for display on the display screen 1. On the other hand, upon receiving an input signal indicating that the coaching session 608 not be initiated, the processor system 505 does not initiate the coaching session 608.

FIG. 11A is a diagram of an embodiment of a system 1100 to illustrate a communication via a router and modem 1104 and a computer network 1102 between the processor system 505 and multiple devices, which include a display device 1106 and a hand-held controller 1108. Examples of the display device 1106 include the display device 1 (FIG. 1), an LCD display device, an LED display device, a plasma display device, and an HMD. Examples of the hand-held controller 1108 include a touch screen, a keypad, a mouse, the game controller 1, and a keyboard. Each of the display device 1106 and the hand-held controller 1108 is used by the user 1. Also, each of the users 2-N uses a hand-held controller having the same structure and function as that of the hand-held controller 1108 and a display device having the same structure and function as that of the display device 1106. The display device 1106 and the hand-held controller 1108 are examples of the client device 602 (FIG. 6).

The system 1100 further includes the router and modem 1104, the computer network 1102, and the processor system 505. The system 1100 also includes a headphone 1110 and the display device 1106. The display device 1106 includes a display screen 1112, such as an LCD display screen, and LED display screen, or a plasma display screen. The display device 1 (FIG. 1) is an example of the display device 1106. An example of the computer network 1102 includes the Internet or an intranet or a combination thereof. An example of the router and modem 1104 includes a gateway device. Another example of the router and modem 1104 includes a router device and a modem device.

The display screen 1112 is coupled to the router and modem 1104 via a wired connection. Examples of a wired connection, as used herein, include a transfer cable, which transfers data in a serial manner, or in a parallel manner, or by applying a universal serial bus (USB) protocol.

The hand-held controller 1108 includes controls 1118, a digital signal processor system (DSPS) 1120, and a communication device 1122. The controls 1118 are coupled to the DSPS 1120, which is coupled to the communication device 1122. Examples of the controls 1118 include buttons and joysticks. Examples of the communication device 1122 includes a communication circuit that enables communication using a wireless protocol, such as Wi-Fi™ or Bluetooth™, between the communication device 1122 and the router and modem 1104.

The communication device 1122 is coupled to the headphone 1110 via a wired connection or a wireless connection. Examples of a wireless connection, as used herein, include a connection that applies a wireless protocol, such as a Wi-Fi™ or Bluetooth™ protocol. Also, the communication device 1122 is coupled to the router and modem 1104 via a wireless connection. Examples of a wireless connection include a Wi-Fi™ connection and a Bluetooth™ connection. The router and modem 1104 is coupled to the computer network 1102, which is coupled to the processor system 505.

During the play of the game, the processor system 505 executes the game program 528 to generate image frame data from one or more game states of the game and applies a network communication protocol, such as transfer control protocol over Internet protocol (TCP/IP), to the image frame data to generate one or more packets and sends the packets via the computer network 1102 to the router and modem 1104. The modem of the router and modem 1104 applies the network communication protocol to the one or more packets received from the computer network 1102 to obtain or extract the image frame data, and provides the image frame data to the router of the router and modem 1104. The router routes the image frame data via the wired connection between the router and the display screen 1112 to the display screen 1112 for display of one or more images of the game based on the image frame data received within the one or more packets.

During the display of one or more images of the game, the game recorder 502 records the game event data 510 and 504, which is used to generate the coaching session 608 or train the model 910 or a combination thereof. Also, during execution of the game program 528, the controls 1118 of the hand-held controller 1108 are selected or moved by the user 1 to generate an input signal, such as the input signal 616, or 623, or 630, or 638, or 642, or an input signal indicating a selection of a segment of the timeline scrubber 730, or any other input signal described herein, which is processed by the DSPS 1120. The DSPS 1120 processes, such as measures or samples or filters or amplifies or a combination thereof, the input signal to output a processed input signal, which has the same information as that within the input signal. For example, the DSPS 1120 identifies a button of the game controller 1 selected by the user 1. As another example, the DSPS 1120 identifies whether a joystick of the game controller 1 is moved or a button of the game controller 1 is selected by the user 1. The processed input signal is sent from the DSPS 1120 to the communication device 1122. The communication device 1122 applies the wireless protocol to the processed input signal to generate one or more wireless packets and sends the wireless packets to the router and modem 1104. The wireless packets include the same information as that included within the processed input signal.

The router of the router and modem 1104 receives the wireless packets from the communication device 1122, and applies the wireless protocol to obtain or extract the processed input signal from the wireless packets. The router of the router and modem 604 provides the processed input signal to the modem of the router and modem 604. The modem applies the network communication protocol to the processed input signal and to generate one or more network packets. For example, the modem determines that the processed input signal is to be sent to the processor system 502 that is executing the game program 506, and embeds a network address of the processor system 505 within the one or more network packets. The modem sends the one or more network packets via the computer network 1102 to the processor system 505.

The processor system 505 applies the network communication protocol to the one or more network packets received from the router and modem 1104 to obtain or extract the information within the processed input signal, and processes the information in a manner explained above with reference to FIG. 6 to initiate the coaching session 608 or to recommend initiation of the coaching session 608 (FIG. 6). The processor system 505 generates an output signal, such as the output signal 618, or 624, or 634 (FIG. 6), or any other output signal, described herein, or any other output signal including image frame data of a coaching scene, described herein, or an output signal including audio data, described herein, and applies the network communication protocol to the output signal to generate one or more network packets. The processor system 505 sends the one or more network packets via the computer network 1102 to the router and modem 1104.

The modem of the router and modem 1104 applies the network communication protocol to the one or more network packets received via the computer network 1102 to obtain or extract the output signal. The router of the router and modem 1104 applies the wireless protocol to the output signal to generate one or more wireless packets and sends the wireless packets to the communication device 1122 of the hand-held controller 1108. The communication device 1122 of the hand-held controller 1108 applies the wireless protocol to the one or more wireless packets received from the router and modem 1104 to obtain or extract the output signal and sends the output signal to the headphone 1110 for output of the audio data as sound to the user 1. For example, the communication device 1122 applies a wired protocol, such as a universal serial bus (USB) protocol, to generate one or more packets having the audio data and sends the one or more packets via the wired connection to the headphone 1110. As another example, the communication device 1122 applies the wireless protocol to the audio data to generate one or more wireless packets and sends the one or more wireless packets via the wireless connection to the headphone 1110.

Also, the router of the router and modem 1104 sends the output signal to the display screen 1112. Upon receiving the output signal, the display screen 1112 displays one or more image frames according to the image frame data of the output signal.

In one embodiment, the communication device 1122 communicates with the router and modem 1104 via a wired connection, such as a cable.

In one embodiment, the display screen 1112 is coupled to the router and modem 1104 via a communication device, such as a communication device that applies a wireless communication protocol. The communication device is a part of the display device 1106. For example, the display screen 1112 is coupled to the communication device. The router 1104 applies the wireless protocol to the image frame data received via the computer network 1102 to generate one or more wireless packets and sends the one or more wireless packets to the communication device of the display device 1106. The communication device applies the wireless protocol to the one or more wireless packets to extract or obtain the image frame data and sends image frame data to the display screen 1112 for display of one or more images of a coaching scene, described herein.

In one embodiment, the display device 1106 and the hand-held controller 1108 are integrated within a mobile device, such as a smartphone or a tablet or a laptop.

Figure 11B:
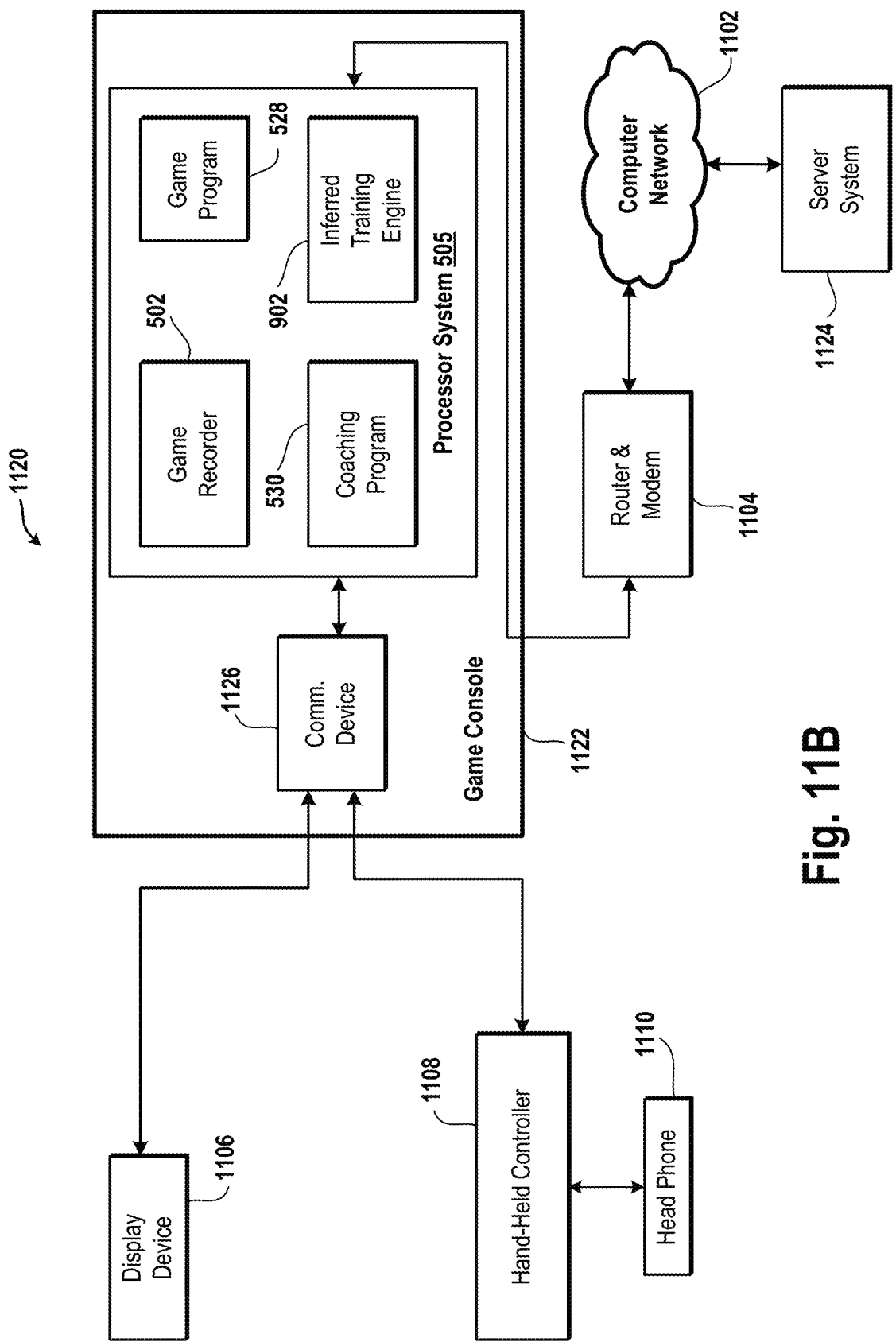
FIG. 11B is a diagram of an embodiment of a system to illustrate that the processor system can be implemented within a game console.

FIG. 11B is a diagram of an embodiment of a system 1120 to illustrate that the processor system 505 can be implemented within a game console 1122. The system 1120 includes the display device 1106, the hand-held controller 1108, the head phone 1110, the game console 1122, the router and modem 1104, the computer network 1102, and a server system 1124. An example of the game console 1124 is a video game console or a computer or a combination of a central processing unit (CPU) and a graphics processing unit (GPU). To illustrate, the game console 1124 is a Sony PlayStation™ or a Microsoft Xbox™. The game console 1124 includes the processor system 505 and a communication device 1126, such as Wi-Fi™ communication device or a Bluetooth™ communication device. As an example, a processor system as used herein, includes one or more CPUs and one or more GPUs, and the one or more CPUs are coupled to the one or more GPUs.

An example of the server system 1124 includes one or more servers within one or more data centers. To illustrate, a server can be a game console or a server blade. As another example, the server system 1124 includes one or more virtual machines. The communication device 1126 is coupled to the communication device of the display device 1106 via a wireless connection, such as a Wi-Fi™ connection or a Bluetooth™ connection. Moreover, the communication device 1126 is coupled to the communication device 1122 of the hand-held controller 1108 via a wireless connection. The communication device 1126 is coupled to the processor system 505. The processor system 505 is coupled to the router and modem 1104 via a wired connection. The router and modem 1104 is coupled via the computer network 1102 to the server system 1124.

The processor system 505 instead of or in conjunction with the server system 1124 executes the game for display of virtual scenes on the display screen 1112 of the display device 1106. For example, in response to receiving login information that is provided by the user 1 via the game controller 1, the processor system 505 sends a request to the server system 1124 via the computer network 1102 to determine whether the login information is valid. Upon receiving an indication from the server system 1124 via the computer network 1102 that the login information received from the game controller 1 is valid, the processor system 505 executes the game program 528 for play of the game by the user 1 via the game controller 1 and the game console 1122. On the other hand, upon receiving an indication from the server system 1124 via the computer network 1102 that the login information received from the game controller 1 is invalid, the processor system 505 does not execute the game program 528 for play by the user 1 via the game controller 1 and the game console 1122.

The communication device 1126 receives the wireless packets having the input signal, such as the input signal 616, or 623, or 630, or 638, or 642 (FIG. 6), or an input signal indicating a selection of a segment of the timeline scrubber 730, or any other input signal described herein, from the hand-held controller 1108, and applies the wireless protocol to the wireless packets to extract the input signal from the wireless packets, and provides the input signal to the processor system 505. The processor system 505 generates an output signal, such as the output signal 618, or 624, or 634 (FIG. 6), or any other output signal, described herein, or any other output signal including image frame data of a coaching scene, described herein, or an output signal including audio data, described herein, based on the input signal in a manner described above. For example, the processor system 505 generates data for the coaching session 608. The processor system 505 provides the output signal to the communication device 1126. The communication device 1126 applies the wireless protocol to the output signal to generate one or more wireless packets and sends the wireless packets to the communication device 1122 of the hand-held controller 1108 or to the display device 1106, or to both the display device 1106 and the hand-held controller 1108.

In one embodiment, some of the functions described herein as being performed by the processor system 505 are performed by the processor system 505 of the game console 1122 and the remaining functions, described herein as being performed by the processor system 505, are instead performed by the server system 1124.

In an embodiment, the processor system 505 is coupled to the display device 1106 via a wired connection. The output signal is sent from the processor system via the wired connection to the display device 1106 for display of one or more images of a coaching scene, described herein, or a virtual scene, described herein, on the display device 1106.

In one embodiment, the game is stored on the game console 1122 and is a non-networked game. In this embodiment, the game is a single player game or a multi-player game and the game console 1122 does not communicate to the server system 1124 to access any portion of the game from the server system 1124.

Figure 11C:
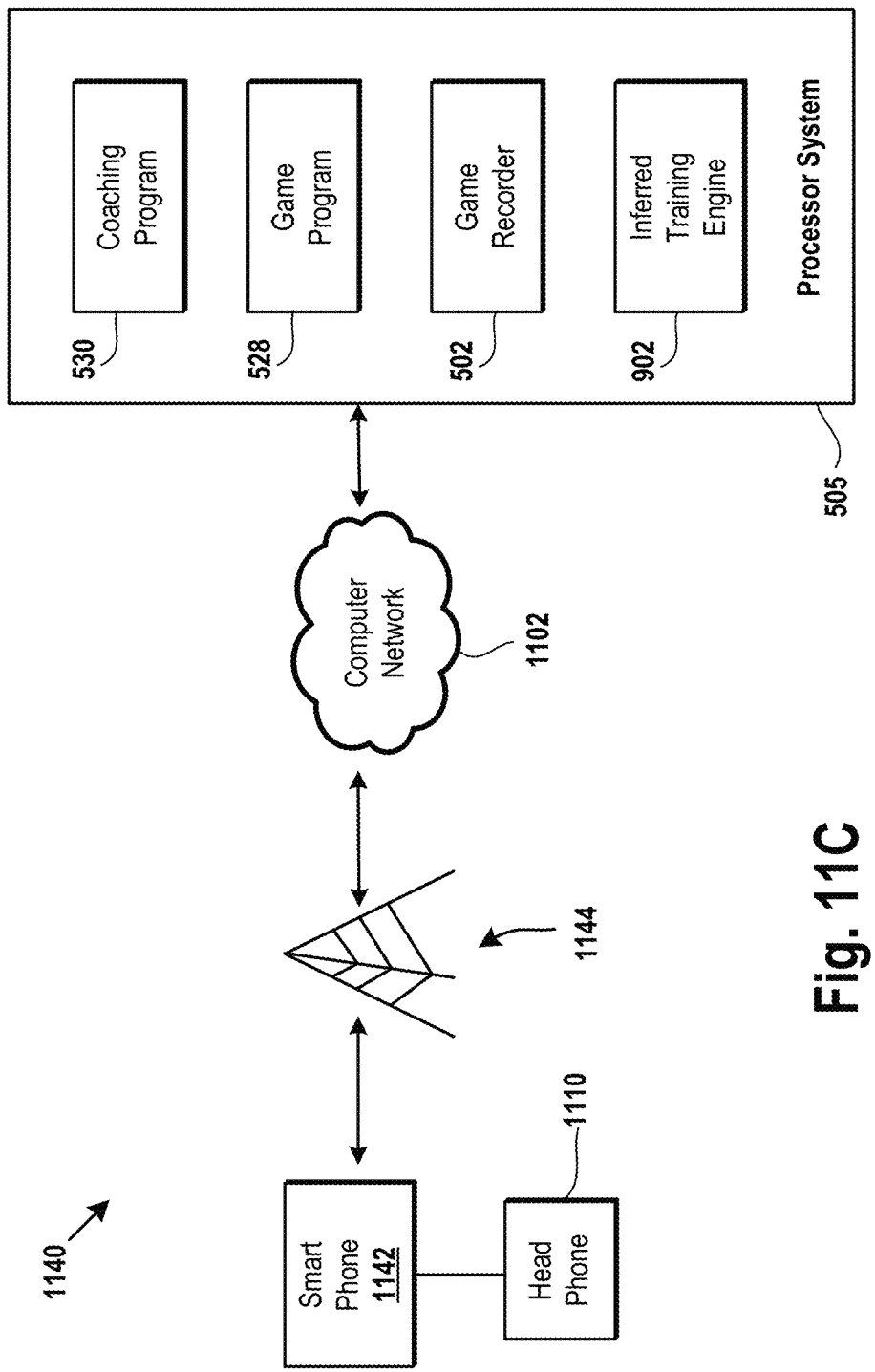
FIG. 11C is a diagram of an embodiment of a system to illustrate communication between a smart phone and the processor system via the computer network without using the router and modem between the computer network and the smart phone.

FIG. 11C is a diagram of an embodiment of a system 1140 to illustrate communication between a smart phone 1142 and the processor system 505 via the computer network 1102 without using the router and modem 1104 between the computer network 1102 and the smart phone 1142. The system 1140 includes the smart phone 1142, the head phone 1110, a cellular network 1144, the computer network 1102, and the processor system 505. The smart phone 1142 is an example of the client device 602 (FIG. 6).

The smart phone 1142 is coupled to the cellular network 1144 via a cellular wireless connection, such as a fourth-generation cellular wireless (4G) connection or a fifth cellular wireless (5G) connection. The cellular network 1144 is coupled to the computer network 1102, which is coupled to the processor system 505.

The smart phone 1142 generates one or more packets by applying a cellular communication protocol, such as the 4G or the 5G protocol, to the input signal, such as the input signal 616, or 623, or 630, or 638, or 642, or an input signal indicating a selection of a segment of the timeline scrubber 730, or any other input signal described herein, and sends the one or more packets to the cellular network 1144. The cellular network 1144 receives the one or more packets and applies the cellular communication protocol to obtain or extract the input signal, and applies the network communication protocol to the input signal to generate one or more network packets. The one or more network packets generated by the cellular network 1144 are sent via the computer network 1102 to the processor system 505. The processor system 505 processes the one or more network packets received from the cellular network 1102 in a manner described above to generate an output signal, such as the output signal 618, or 624, or 634, or any other output signal, described herein, or any other output signal including image frame data of a coaching scene, described herein, or an output signal including audio data, described herein, and sends one or more network packets including the output signal via the computer network 1102 to the cellular network 1144.

The cellular network 1144 applies the network communication protocol to the one or more network packets received from the processor system 505 to extract or obtain the output signal, and applies the cellular communication protocol to the output signal to generate one or more packets. The cellular network 1102 sends the one or more packets including the output signal to the smart phone 1142.

Figure 12A:
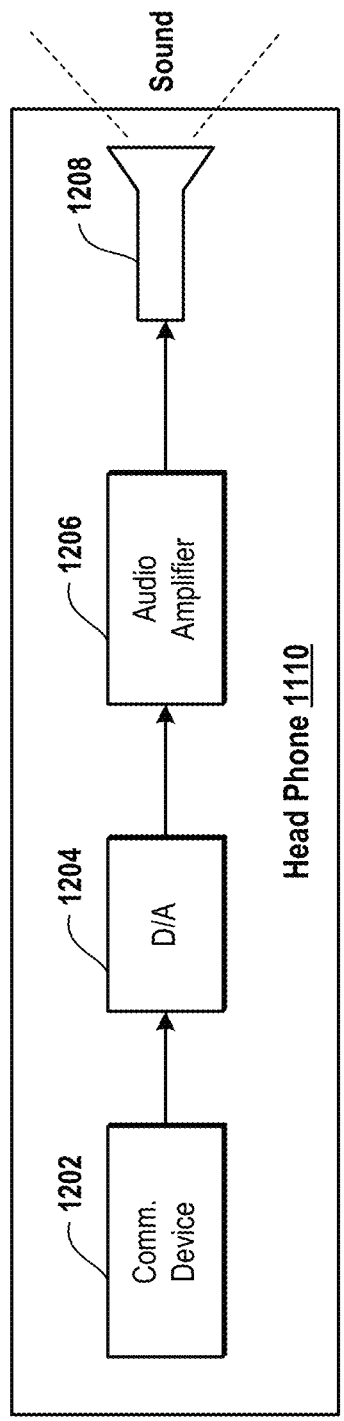
FIG. 12A is a diagram of an embodiment of a headphone.

FIG. 12A is a diagram of an embodiment of the headphone 1110. The headphone 1110 includes a communication device 1202, a digital-to-analog (D/A) converter 1204, an audio amplifier 1206, and a speaker 1208. An example of the communication device 1202 is a communication circuit that applies the wired protocol or the wireless protocol.

The communication device 1202 is coupled to the communication device 1122 (FIG. 11A) of the hand-held controller 1108 or to the smart phone 1142 (FIG. 11C). The digital-to-analog converter 1204 is coupled to the communication device 1202 and the audio amplifier 1206 is coupled to the digital-to-analog converter 1204. Also, the speaker 1208 is coupled to the audio amplifier 1206.

The communication device 1202 receives one or more packets having the audio data 805 (FIG. 8C) from the communication device 1122 (FIG. 11A) or from the smart phone 1142 (FIG. 11C), and applies a protocol, such as the wired protocol or the wireless protocol, to extract or obtain the audio data 805 from the one or more packets. The communication device 1202 sends the audio data 805 to the digital-to-analog converter 1204. The digital-to-analog converter 1204 converts the audio data 805 from a digital format to an analog format to output analog audio signals. The digital-to-analog converter 1204 sends the analog audio signals output based on the audio data 805 to the audio amplifier 1206. The audio amplifier 1206 amplifies, such as increases an amplitude or a magnitude, of the analog audio signals to output amplified audio signals, which are electrical signals. The speaker 1208 converts electrical energy of the amplified audio signals into sound energy to output sounds to be heard by the user 1 (FIG. 1).

In one embodiment, instead of the speaker 1208, multiple speakers are used.

Figure 12B:
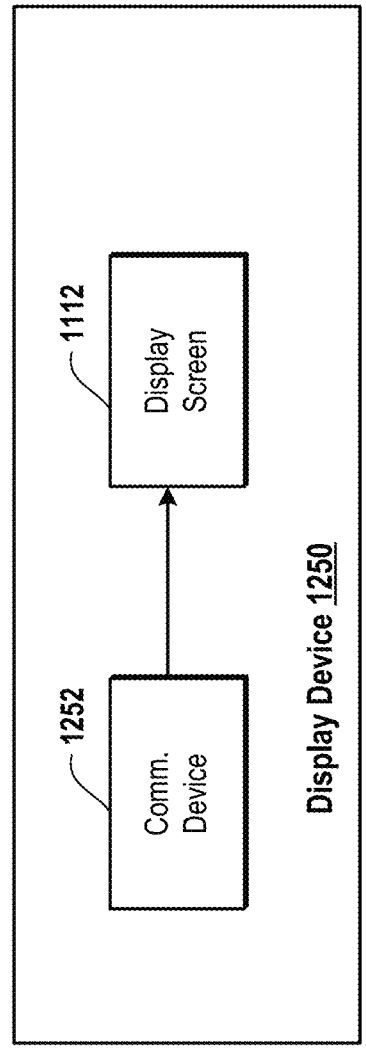
FIG. 12B is a diagram of an embodiment of a display device for displaying an image of a coaching scene or a virtual scene on a display screen.

FIG. 12B is a diagram of an embodiment of the display device 1250 to for displaying an image of a coaching scene or a virtual scene, described herein, on the display screen 1112. The display device 1250 is an example of the display device 1 (FIG. 1). The display device 1250 includes a communication device 1252 and the display screen 1112. Examples of the display device 1250 include an LCD display device, an LED display device, and a plasma display device. Examples of the display screen 1112 include an LCD display screen, and LED display screen, and a plasma display screen. To illustrate, the display device 1250 is a display device of the smart phone 1142 or of the game controller 1 or of a tablet or of a computer. Examples of a computer include a desktop computer and a laptop computer. Examples of the communication device 1252 include a communication circuit that applies the wired or wireless protocol for communication of data. The communication device 1252 is coupled to the display screen 1112.

Instead of or in addition to generating other forms of data, such as the audio data 805 (FIG. 8C), the processor system 505 generates image frame data of a coaching scene or a virtual scene, described herein. In the same manner in which the processor system 505 generates one or more packets having the audio data 505, the processor system 505 or the communication device 1126 (FIG. 11B) generates one or more packets by applying a protocol, such as the network communication protocol, the wired protocol, or the wireless protocol, to the image frame data and sends the one or more packets to the display device 1250. For example, with reference to FIG. 11A, the processor system 505 applies the network communication protocol to the image frame data to generate one or more network packets and sends the one or more network packets via the computer network 1102 to the router and modem 1104 (FIG. 11A). The router and modem 1104 processes the one or more network packets having the image frame data in the same manner in which the router and modem 1104 processes the one or more network packets having the audio data 805 to obtain the image frame data from the one or more network packets, applies the wireless protocol to the image frame data to generate one or more wireless packets, and sends the one or more wireless packets to the communication device 1252. As another example, with reference to FIG. 11B, the communication device 1126 of the game console 1122 applies the wireless protocol to the image frame data to generate one or more wireless packets, and sends the wireless packets to the communication device 1252 of the display device 1250. As another example, with reference to FIG. 11C, the cellular network 1144 receives one or more network packets having the image frame data via the computer network 1102 from the processor system 505 and applies the network communication protocol to extract the image frame data from the one or more network packets, and applies the cellular communication protocol to the image frame data to generate one or more packets. The cellular network 1144 sends the one or more packets having the image frame data to the smart phone 1142.

Referring back to FIG. 12B, the communication device 1152 receives the one or more packets having the image frame data and applies a protocol, such as the cellular communication protocol, the wired protocol, or the wireless protocol, to extract or obtain the image frame data from the one or more packets, and sends the image frame data to the display screen 1112. Upon receiving the image frame data, the display screen 1112 displays the coaching scene or the virtual scene, described herein.

Figure 13:
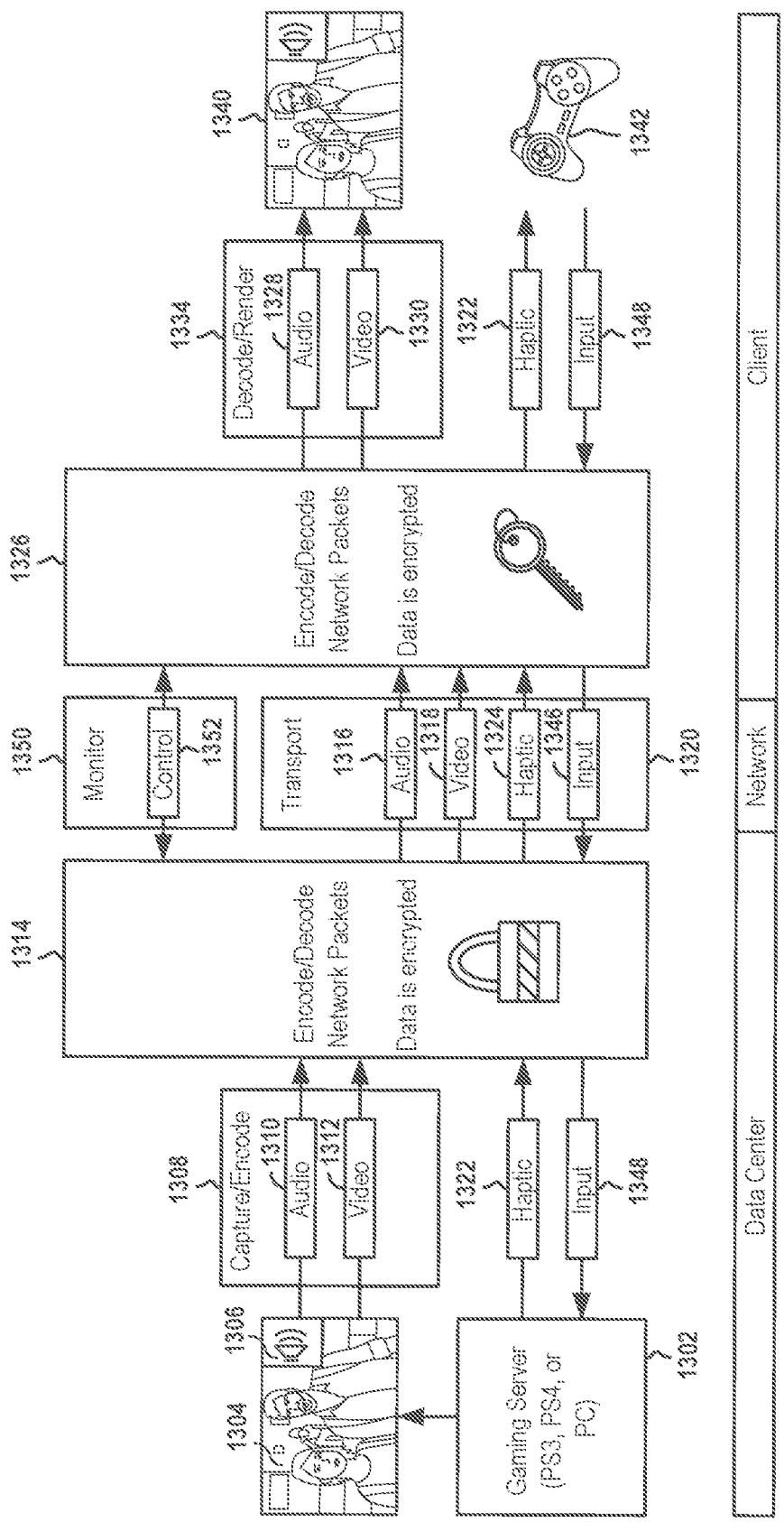
FIG. 13 is a flow diagram conceptually illustrating various operations which are performed for streaming a cloud video game to a client device, in accordance with various implementations of the present disclosure.

FIG. 13 is a flow diagram conceptually illustrating various operations which are performed for streaming a cloud video game to a client device, in accordance with implementations of the disclosure. Examples of the client device include a game controller, a smart phone, a game console, and a computer. A game server 1302 executes a video game and generates raw (uncompressed) video 1304 and audio 1306. The game event data 510 or the game event data 504 or a combination thereof is an example of a recording of combination of the video 1004 and audio 1306. The game server 1302 is an example of the processor system 505. The video 1304 and audio 1306 are captured and encoded for streaming purposes, as indicated at reference 1308 in the illustrated diagram. The encoding provides for compression of the video and audio streams to reduce bandwidth usage and optimize the gaming experience. Examples of encoding formats include H.265/MPEG-H, H.264/MPEG-4, H.263/MPEG-4, H.262/MPEG-2, WMV, VP6/7/8/9, etc.

Encoded audio 1310 and encoded video 1312 are further packetized into network packets, as indicated at reference numeral 1314, for purposes of transmission over a computer network 1320, which is an example of the computer network 1102 (FIG. 11A). In some embodiments, the network packet encoding process also employs a data encryption process, thereby providing enhanced data security. In the illustrated implementation, audio packets 1316 and video packets 1318 are generated for transport over the computer network 1320.

The game server 1302 additionally generates haptic feedback data 1322, which is also packetized into network packets for network transmission. In the illustrated implementation, haptic feedback packets 1324 are generated for transport over the computer network 1320.

The foregoing operations of generating the raw video and audio and the haptic feedback data are performed on the game server 1302 of a data center, and the operations of encoding the video and audio, and packetizing the encoded audio/video and haptic feedback data for transport are performed by the streaming engine of the data center. As indicated at reference 1320, the audio, video, and haptic feedback packets are transported over the computer network. As indicated at reference 1326, the audio packets 1316, video packets 1318, and haptic feedback packets 1324, are disintegrated, e.g., parsed, etc., by the client device 602 (FIG. 6) to extract encoded audio 1328, encoded video 1330, and haptic feedback data 1322 at the client device 602 from the network packets. If data has been encrypted, then the data is also decrypted. The encoded audio 1328 and encoded video 1330 are then decoded by the client device, as indicated at reference 1334, to generate client-side raw audio and video data for rendering on a display device 1340 of the client device 602. The haptic feedback data 1322 is processed by the processor of the client device 602 to produce a haptic feedback effect at a controller device 1342 or other interface device, e.g., the HMD, etc., through which haptic effects can be rendered. The controller device 1342 is an example of the game controller 1. One example of a haptic effect is a vibration or rumble of the controller device 1342.

It will be appreciated that a video game is responsive to user inputs, and thus, a similar procedural flow to that described above for transmission and processing of user input, but in the reverse direction from client device to server, is performed. As shown, the controller device 1342 or another input device, e.g., the body part of the user 1, etc., or a combination thereof generates input data 1348. Any of the control input signals 616, 623, 630, 638, and 642 (FIG. 6) is an example of the input data 1348. The input data 1348 is packetized at the client device for transport over the computer network 1320 to the data center. Input data packets 1346 are unpacked and reassembled by the game server 1302 to define the input data 1348 on the data center side. The input data 1348 is fed to the game server 1302, which processes the input data 1348 to generate a game state of the game.

During transport via the computer network 1320 of the audio packets 1316, the video packets 1318, and haptic feedback packets 1324, in some embodiments, the transmission of data over the computer network 1320 is monitored to ensure a quality of service. For example, network conditions of the computer network 1320 are monitored as indicated by reference 1350, including both upstream and downstream network bandwidth, and the game streaming is adjusted in response to changes in available bandwidth. That is, the encoding and decoding of network packets is controlled based on present network conditions, as indicated by reference 1352.

Figure 14:
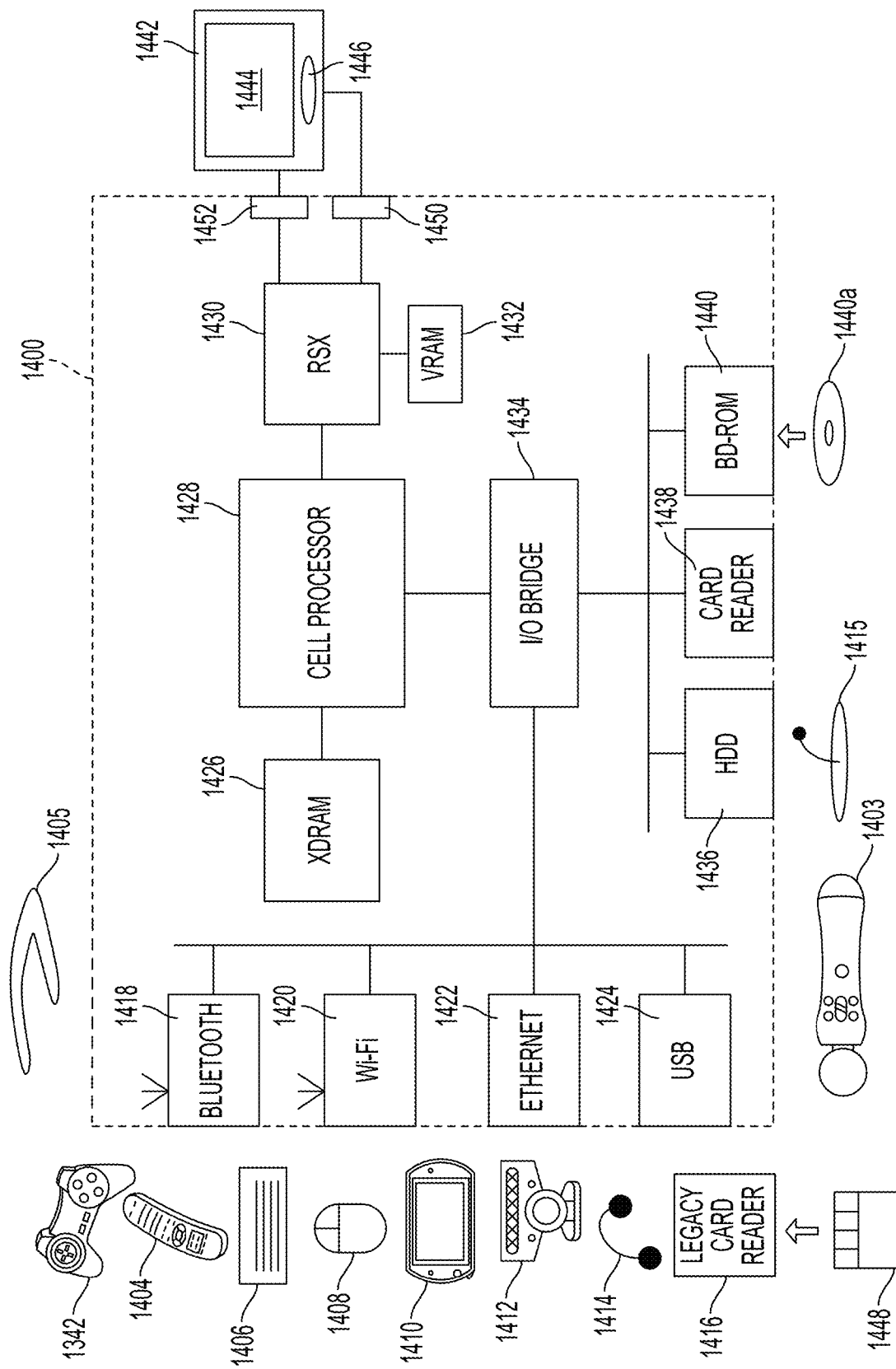
FIG. 14 is a block diagram of an embodiment of the game console that is compatible for interfacing with a display device of the client device and is capable of communicating via the computer network with a game hosting system.

FIG. 14 is a block diagram of an embodiment of a game console 1400 that is compatible for interfacing with a display device of the client device and is capable of communicating via the computer network 1320 with a game hosting system, such as the processor system 505 (FIG. 5). The game console 1122 (FIG. 11) is an example of the game console 1400. The game console 1400 is located within a data center A or is located at a location at which the user 1 is located. In some embodiments, the game console 1400 is used to execute a game that is displayed on an HMD 1405. The game console 1400 is provided with various peripheral devices connectable to the game console 1400. The game console 1400 has a cell processor 1428, a dynamic random access memory (XDRAM) unit 1426, a Reality Synthesizer graphics processor unit 1430 with a dedicated video random access memory (VRAM) unit 1432, and an input/output (I/O) bridge 1434. The game console 1400 also has a Blu Ray® Disk read-only memory (BD-ROM) optical disk reader 1440 for reading from a disk 1440*a* and a removable slot-in hard disk drive (HDD) 1436, accessible through the I/O bridge 1434. Optionally, the game console 1400 also includes a memory card reader 1438 for reading compact flash memory cards, memory Stick® memory cards and the like, which is similarly accessible through the I/O bridge 1434. The I/O bridge 1434 also connects to USB 2.0 ports 1424, a gigabit Ethernet port 1422, an IEEE 802.11b/g wireless network (Wi-Fi™) port 1420, and a Bluetooth® wireless link port 1418 capable of supporting Bluetooth connections.

In operation, the I/O bridge 1434 handles all wireless, USB and Ethernet data, including data from a game controller and from the HMD 1405. For example, when the user 1 is playing the game generated by execution of a portion of a game code, such as the game program 528 (FIG. 11A), the I/O bridge 1434 receives input data or an input signal, described herein, from the game controllers 1342 or 1403 and/or from the HMD 1405 via a Bluetooth link and directs the input data to the cell processor 1428, which updates a current state of the game accordingly. As an example, a camera within the HMD 1405 captures a gesture of the user 1 to generate an image representing the gesture. The game controller 1342 is an example of the game controller 1, which is an example of the HHC.

The wireless, USB and Ethernet ports also provide connectivity for other peripheral devices in addition to the game controllers 1342 and 1403 and the HMD 1405, such as, for example, a remote control 1404, a keyboard 1406, a mouse 1408, a portable entertainment device 1410, such as, e.g., a Sony Playstation Portable® entertainment device, etc., a video camera, such as, e.g., an EyeToy® video camera 1412, etc., a microphone headset 1414, and a microphone 1415. The portable entertainment device 1410 is an example of a game controller. In some embodiments, such peripheral devices are connected to the game console 1400 wirelessly, for example, the portable entertainment device 1410 communicates via a Wi-Fi™ ad-hoc connection, whilst the microphone headset 1414 communicates via a Bluetooth link. The microphone headset 1414 is an example of the head phone 803 (FIG. 8C).

The provision of these interfaces means that the game console 1400 is also potentially compatible with other peripheral devices such as digital video recorders (DVRs), set-top boxes, digital cameras, portable media players, Voice over Internet protocol (IP) telephones, mobile telephones, printers and scanners.

In addition, a legacy memory card reader 1416 is connected to the game console 1400 via the USB port 1424, enabling the reading of memory cards 1448 of a kind used by the game console 1400. The game controllers 1342 and 1403 and the HMD 1405 are operable to communicate wirelessly with the game console 1400 via the Bluetooth link 1418, or to be connected to the USB port 1424, thereby also receiving power by which to charge batteries of the game controller 1342 and 1403 and the HMD 1405. In some embodiments, each of the game controllers 1342 and 1403 and the HMD 1405 includes a memory, a processor, a memory card reader, permanent memory, such as, e.g., flash memory, etc., light emitters such as, e.g., an illuminated spherical section, light emitting diodes (LEDs), or infrared lights, etc., microphone and speaker for ultrasound communications, an acoustic chamber, a digital camera, an internal clock, a recognizable shape, such as, e.g., a spherical section facing the game console 1400, and wireless devices using protocols, such as, e.g., Bluetooth, Wi-Fi, etc.

The game controller 1342 is a controller designed to be used with two hands by the user 1, and game controller 1403 is a single-hand controller with an attachment. The HMD 1405 is designed to fit on top of a head and/or in front of eyes of the user 1. In addition to one or more analog joysticks and conventional control buttons, each game controller 1342 and 1403 is susceptible to three-dimensional location determination. Similarly, the HMD 1405 is susceptible to three-dimensional location determination. Consequently, in some embodiments, gestures and movements by the user 1 of the game controller 1342 and 1403 and of the HMD 1405 are translated as inputs to a game in addition to or instead of conventional button or joystick commands. Optionally, other wirelessly enabled peripheral devices, such as, e.g., the Playstation™ Portable device, etc., are used as a controller. In the case of the Playstation™ Portable device, additional game or control information, e.g., control instructions or number of lives, etc., is provided on a display screen of the device. In some embodiments, other alternative or supplementary control devices are used, such as, e.g., a dance mat (not shown), a light gun (not shown), a steering wheel and pedals (not shown), bespoke controllers, etc. Examples of bespoke controllers include a single or several large buttons for a rapid-response quiz game (also not shown).

The remote control 1404 is also operable to communicate wirelessly with the game console 1400 via the Bluetooth link 1418. The remote control 1404 includes controls suitable for the operation of the Blu Ray Disk BD-ROM reader 1440 and for navigation of disk content.

The Blu Ray™ Disk BD-ROM reader 1440 is operable to read CD-ROMs compatible with the game console 1400, in addition to conventional pre-recorded and recordable CDs, and so-called Super Audio CDs. The Blu Ray™ Disk BD-ROM reader 1440 is also operable to read digital video disk-ROMs (DVD-ROMs) compatible with the game console 1100, in addition to conventional pre-recorded and recordable DVDs. The Blu Ray™ Disk BD-ROM reader 1440 is further operable to read BD-ROMs compatible with the game console 1400, as well as conventional pre-recorded and recordable Blu-Ray Disks.

The game console 1400 is operable to supply audio and video, either generated or decoded via the Reality Synthesizer graphics unit 1430, through audio connectors 1450 and video connectors 1452 to a display and sound output device 1442, such as, e.g., a monitor or television set, etc., having a display screen 1444 and one or more loudspeakers 1446, or to supply the audio and video via the Bluetooth® wireless link port 1118 to the display device of the HMD 1405. The audio connectors 1450, in various embodiments, include conventional analogue and digital outputs whilst the video connectors 1452 variously include component video, S-video, composite video, and one or more High Definition Multimedia Interface (HDMI) outputs. Consequently, video output may be in formats such as phase alternating line (PAL) or National Television System Committee (NTSC), or in 2220p, 1080i or 1080p high definition. Audio processing, e.g., generation, decoding, etc., is performed by the cell processor 1408. An operating system of the game console 1400 supports Dolby® 5.1 surround sound, Dolby® Theatre Surround (DTS), and the decoding of 7.1 surround sound from Blu-Ray® disks. The display and sound output device 1442 is an example of the display device 1 (FIG. 1).

In some embodiments, a video camera, e.g., the video camera 1412, etc., comprises a single charge coupled device (CCD), an LED indicator, and hardware-based real-time data compression and encoding apparatus so that compressed video data is transmitted in an appropriate format such as an intra-image based motion picture expert group (MPEG) standard for decoding by the game console 1400. An LED indicator of the video camera 1412 is arranged to illuminate in response to appropriate control data from the game console 1400, for example, to signify adverse lighting conditions, etc. Some embodiments of the video camera 1112 variously connect to the game console 1400 via a USB, Bluetooth or Wi-Fi communication port. Various embodiments of a video camera include one or more associated microphones and also are capable of transmitting audio data. In several embodiments of a video camera, the CCD has a resolution suitable for high-definition video capture. In use, images captured by the video camera are incorporated within a game or interpreted as game control inputs. In another embodiment, a video camera is an infrared camera suitable for detecting infrared light.

In various embodiments, for successful data communication to occur with a peripheral device, such as, for example, a video camera or remote control via one of the communication ports of the game console 1400, an appropriate piece of software, such as, a device driver, etc., is provided.

In some embodiments, the aforementioned system devices, including the game console 1400, the HHC, and the HMD 1405 enable the HMD 1405 to display and capture video of an interactive session of a game. The system devices initiate an interactive session of a game, the interactive session defining interactivity between the user 1 and other users and the game. The system devices further determine an initial position and orientation of the HHC, and/or the HMD 1405 operated by the user 1. The game console 1400 determines a current state of a game based on the interactivity between the user 1 and the game. The system devices track a position and orientation of the HHC and/or the HMD 1405 during an interactive session of the user 1 with a game. The system devices generate a spectator video stream of the interactive session based on a current state of a game and the tracked position and orientation of the HHC and/or the HMD 1405. In some embodiments, the HHC renders the spectator video stream on a display screen of the HHC. In various embodiments, the HMD 1405 renders the spectator video stream on a display screen of the HMD 1405.

Figure 15:
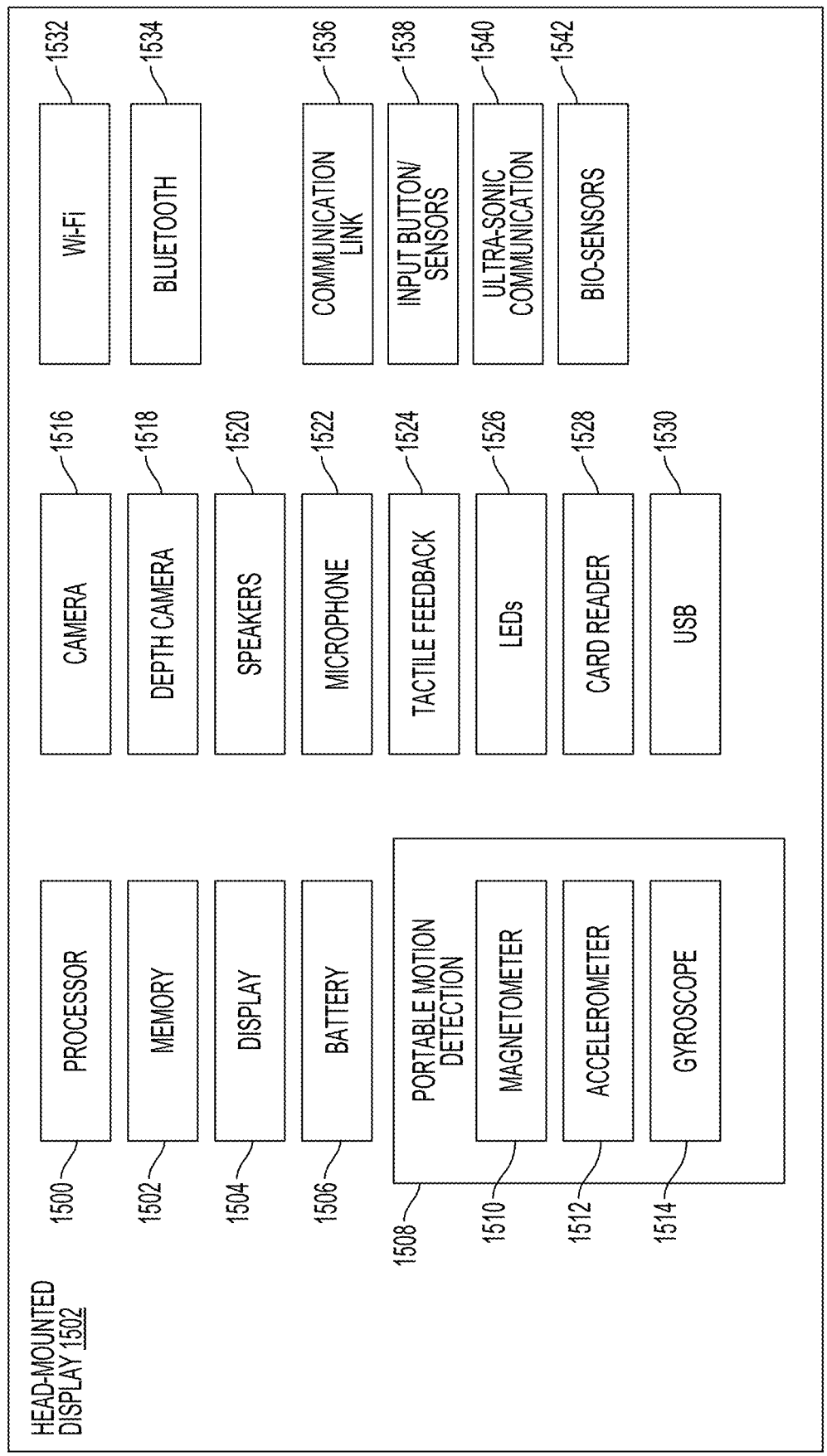
FIG. 15 is a diagram of an embodiment of a head-mounted display (HMD) to illustrate components of the HMD.

With reference to FIG. 15, a diagram illustrating components of an HMD 1502 is shown. The HMD 1502 is an example of the HMD 1405 (FIG. 14). The HMD 1502 includes a processor 1500 for executing program instructions. A memory device 1502 is provided for storage purposes. Examples of the memory device 1502 include a volatile memory, a non-volatile memory, or a combination thereof. A display device 1504 is included which provides a visual interface, e.g., display of image frames generated from save data, etc., that any the user 1 (FIG. 1) views. A battery 1506 is provided as a power source for the HMD 1502. A motion detection module 1508 includes any of various kinds of motion sensitive hardware, such as a magnetometer 1510, an accelerometer 1512, and a gyroscope 1514.

An accelerometer is a device for measuring acceleration and gravity induced reaction forces. Single and multiple axis models are available to detect magnitude and direction of the acceleration in different directions. The accelerometer is used to sense inclination, vibration, and shock. In one embodiment, three accelerometers 1512 are used to provide the direction of gravity, which gives an absolute reference for two angles, e.g., world-space pitch and world-space roll, etc.

A magnetometer measures a strength and a direction of a magnetic field in a vicinity of the HMD 1502. In some embodiments, three magnetometers 1510 are used within the HMD 1502, ensuring an absolute reference for the world-space yaw angle. In various embodiments, the magnetometer is designed to span the earth magnetic field, which is ±80 microtesla. Magnetometers are affected by metal, and provide a yaw measurement that is monotonic with actual yaw. In some embodiments, a magnetic field is warped due to metal in the real-world environment, which causes a warp in the yaw measurement. In various embodiments, this warp is calibrated using information from other sensors, e.g., the gyroscope 1514, a camera 1516, etc. In one embodiment, the accelerometer 1512 is used together with magnetometer 1510 to obtain the inclination and azimuth of the HMD 1502.

A gyroscope is a device for measuring or maintaining orientation, based on the principles of angular momentum. In one embodiment, instead of the gyroscope 1514, three gyroscopes provide information about movement across the respective axis (x, y and z) based on inertial sensing. The gyroscopes help in detecting fast rotations. However, the gyroscopes, in some embodiments, drift overtime without the existence of an absolute reference. This triggers resetting the gyroscopes periodically, which can be done using other available information, such as positional/orientation determination based on visual tracking of an object, accelerometer, magnetometer, etc.

The camera 1516 is provided for capturing images and image streams of a real-world environment, e.g., room, cabin, natural environment, etc., surrounding any of the users 1-3. In various embodiments, more than one camera is included in the HMD 1502, including a camera that is rear-facing, e.g., directed away from the user 1 when the user 1 is viewing the display of the HMD 1502, etc., and a camera that is front-facing, e.g., directed towards the user 1 when the user 1 is viewing the display of the HMD 1502, etc. Additionally, in several embodiments, a depth camera 1518 is included in the HMD 1502 for sensing depth information of objects in the real-world environment.

The HMD 1502 includes speakers 1520 for providing audio output. Also, a microphone 1522 is included, in some embodiments, for capturing audio from the real-world environment, including sounds from an ambient environment, and speech made by the user 1, etc. The HMD 1502 includes a tactile feedback module 1524, e.g., a vibration device, etc., for providing tactile feedback to the user 1. In one embodiment, the tactile feedback module 1524 is capable of causing movement and/or vibration of the HMD 1502 to provide tactile feedback to the user 1.

LEDs 1526 are provided as visual indicators of statuses of the HMD 1502. For example, an LED may indicate battery level, power on, etc. A card reader 1528 is provided to enable the HMD 1502 to read and write information to and from a memory card. A USB interface 1530 is included as one example of an interface for enabling connection of peripheral devices, or connection to other devices, such as other portable devices, computers, etc. In various embodiments of the HMD 1502, any of various kinds of interfaces may be included to enable greater connectivity of the HMD 1502.

A Wi-Fi™ module 1532 is included for enabling connection to the Internet via wireless networking technologies. Also, the HMD 1502 includes a Bluetooth™ module 1534 for enabling wireless connection to other devices. A communications link 1536 is also included, in some embodiments, for connection to other devices. In one embodiment, the communications link 1536 utilizes infrared transmission for wireless communication. In other embodiments, the communications link 1536 utilizes any of various wireless or wired transmission protocols for communication with other devices.

Input buttons/sensors 1538 are included to provide an input interface for the user 1 (FIG. 1). Any of various kinds of input interfaces are included, such as buttons, touchpad, joystick, trackball, etc. An ultra-sonic communication module 1540 is included, in various embodiments, in the HMD 1502 for facilitating communication with other devices via ultra-sonic technologies.

Bio-sensors 1542 are included to enable detection of physiological data from the user 1. In one embodiment, the bio-sensors 1542 include one or more dry electrodes for detecting bio-electric signals of the user 1 through the user 1's skin.

The foregoing components of HMD 1502 have been described as merely exemplary components that may be included in HMD 1502. In various embodiments, the HMD 1502 include or do not include some of the various aforementioned components.

Figure 16:
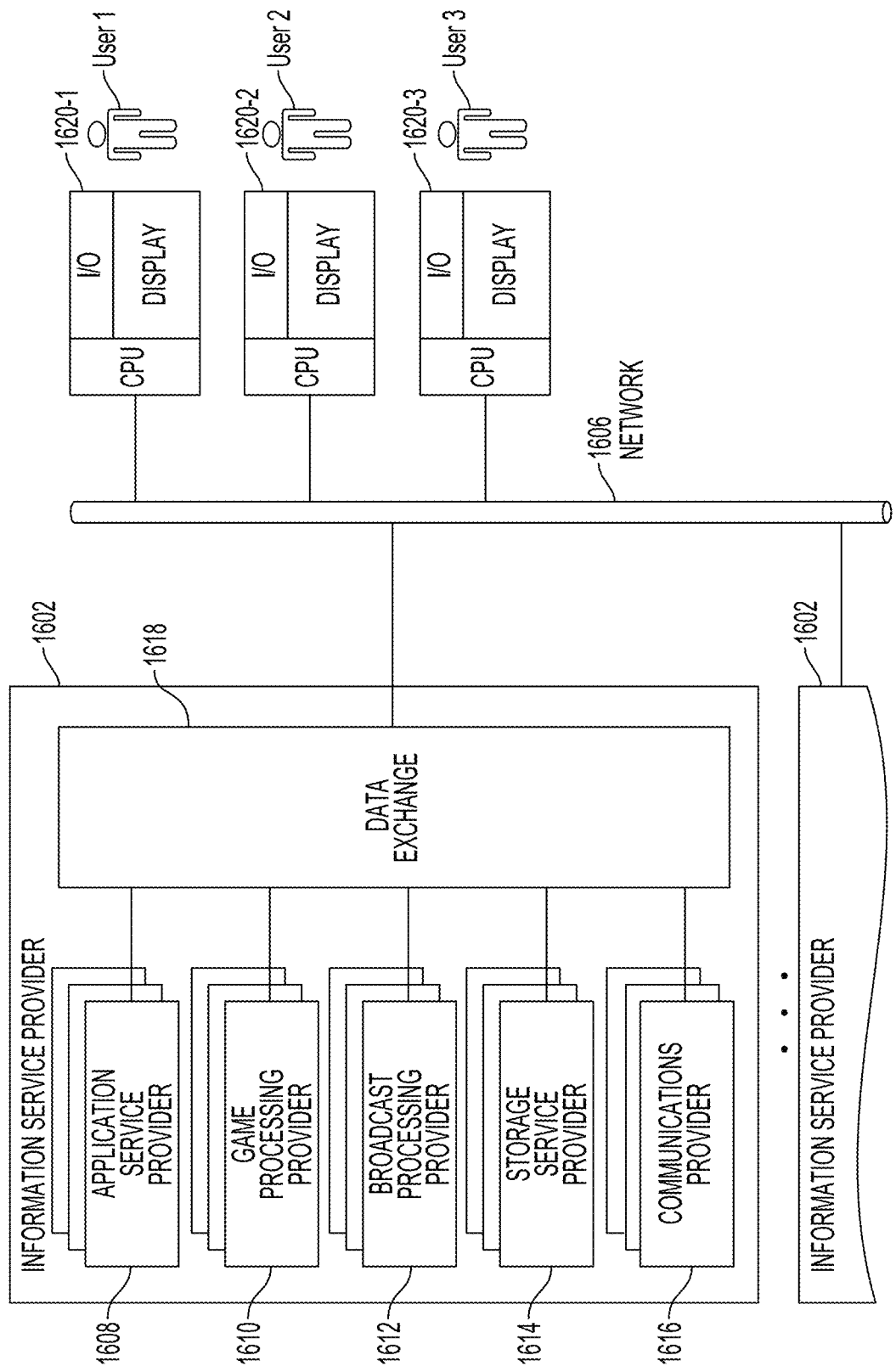
FIG. 16 illustrates an embodiment of an Information Service Provider (INSP) architecture.

FIG. 16 illustrates an embodiment of an Information Service Provider (INSP) architecture. INSPs 1302 delivers a multitude of information services to the user 1 geographically dispersed and connected via a computer network 1606, e.g., a LAN, a WAN, or a combination thereof, etc. The computer network 1102 (FIG. 11A) is an example of the computer network 1606. An example of the WAN includes the Internet and an example of the LAN includes an Intranet. The user 1 operates a client device 1620-1, another user 2 operates another client device 1620-2, and yet another user 3 operates yet another client device 1620-3. The client device 1620-1 is an example of the client device 602 (FIG. 6).

In some embodiments, each client device 1620-1, 1620-2, and 1620-3 includes a central processing unit (CPU), a display, and an input/output (I/O) interface. Examples of each client device 1620-1, 1620-2, and 1620-3 include a personal computer (PC), a mobile phone, a netbook, a tablet, a gaming system, a personal digital assistant (PDA), the game console 1400 and a display device, the HMD 1502 (FIG. 15), the game console 1400 and the HMD 1502, a desktop computer, a laptop computer, and a smart television, etc. In some embodiments, the INSP 1602 recognizes a type of a client device and adjusts a communication method employed.

In some embodiments, an INSP delivers one type of service, such as stock price updates, or a variety of services such as broadcast media, news, sports, gaming, etc. Additionally, the services offered by each INSP are dynamic, that is, services can be added or taken away at any point in time. Thus, an INSP providing a particular type of service to a particular individual can change over time. For example, the client device 1620-1 is served by an INSP in near proximity to the client device 1620-1 while the client device 1620-1 is in a home town of the user 1, and client device 1620-1 is served by a different INSP when the user 1 travels to a different city. The home-town INSP will transfer requested information and data to the new INSP, such that the information "follows" the client device 1620-1 to the new city making the data closer to the client device 1620-1 and easier to access. In various embodiments, a master-server relationship is established between a master INSP, which manages the information for the client device 1620-1, and a server INSP that interfaces directly with the client device 1620-1 under control from the master INSP. In some embodiments, data is transferred from one ISP to another ISP as the client device 1620-1 moves around the world to make the INSP in better position to service client device 1620-1 be the one that delivers these services.

The INSP 1602 includes an Application Service Provider (ASP) 1608, which provides computer-based services to customers over the computer network 1606. Software offered using an ASP model is also sometimes called on-demand software or software as a service (SaaS). A simple form of providing access to a computer-based service, e.g., customer relationship management, etc., is by using a standard protocol, e.g., a hypertext transfer protocol (HTTP), etc. The application software resides on a vendor's server and is accessed by each client device 1620-1, 1620-2, and 1620-3 through a web browser using a hypertext markup language (HTML), etc., by a special purpose client software provided by the vendor, and/or other remote interface, e.g., a thin client, etc.

Services delivered over a wide geographical area often use cloud computing. Cloud computing is a style of computing in which dynamically scalable and often virtualized resources are provided as a service over the computer network 1606. The users 1-3 do not need to be an expert in the technology infrastructure in the "cloud" that supports them. Cloud computing is divided, in some embodiments, in different services, such as Infrastructure as a Service (IaaS), Platform as a Service (PaaS), and Software as a Service (SaaS). Cloud computing services often provide common business applications online that are accessed from a web browser, while the software and data are stored on the servers. The term cloud is used as a metaphor for the computer network 1606, e.g., using servers, storage and logic, etc., based on how the computer network 1606 is depicted in computer network diagrams and is an abstraction for the complex infrastructure it conceals.

Further, the INSP 1602 includes a game processing provider (GPP) 1610, also sometime referred to herein as a game processing server, which is used by the client devices 1620-1, 1620-2, and 1620-3 to play single and multiplayer video games. Most video games played over the computer network 1606 operate via a connection to a game server. Typically, games use a dedicated server application that collects data from the client devices 1620-1, 1620-2, and 1620-3 and distributes it to other clients that are operated by other users. This is more efficient and effective than a peer-to-peer arrangement, but a separate server is used to host the server application. In some embodiments, the GPP 1610 establishes communication between the client devices 1620-1, 1620-2, and 1620-3, which exchange information without further relying on the centralized GPP 1610.

Dedicated GPPs are servers which run independently of a client. Such servers are usually run on dedicated hardware located in data centers, providing more bandwidth and dedicated processing power. Dedicated servers are a method of hosting game servers for most PC-based multiplayer games. Massively multiplayer online games run on dedicated servers usually hosted by the software company that owns the game title, allowing them to control and update content.

A broadcast processing server (BPS) 1612, sometimes referred to herein as a broadcast processing provider, distributes audio or video signals to an audience. Broadcasting to a very narrow range of audience is sometimes called narrowcasting. A final leg of broadcast distribution is how a signal gets to the client devices 1620-1, 1620-2, and 1620-3, and the signal, in some embodiments, is distributed over the air as with a radio station or a television station to an antenna and receiver, or through a cable television or cable radio or "wireless cable" via the station. The computer network 1606 also brings, in various embodiments, either radio or television signals to the client devices 1620-1, 1620-2, and 1620-3, especially with multicasting allowing the signals and bandwidth to be shared. Historically, broadcasts are delimited, in several embodiments, by a geographic region, e.g., national broadcasts, regional broadcasts, etc. However, with the proliferation of high-speed Internet, broadcasts are not defined by geographies as content can reach almost any country in the world.

A storage service provider (SSP) 1614 provides computer storage space and related management services. The SSP 1614 also offers periodic backup and archiving. By offering storage as a service, the client devices 1620-1, 1620-2, and 1620-3 use more storage compared to when storage is not used as a service. Another major advantage is that the SSP 1614 includes backup services and the client devices 1620-1, 1620-2, and 1620-3 will not lose data if their hard drives fail. Further, a plurality of SSPs, in some embodiments, have total or partial copies of the data received from the client devices 1620-1, 1620-2, and 1620-3, allowing the client devices 1620-1, 1620-2, and 1620-3 to access data in an efficient way independently of where the client devices 1620-1, 1620-2, and 1620-3 are located or of types of the clients. For example, the user 1 accesses personal files via a home computer, as well as via a mobile phone while the user 1 is on the move.

A communications provider 1616 provides connectivity to the client devices 1620-1, 1620-2, and 1620-3. One kind of the communications provider 1616 is an Internet service provider (I6P) which offers access to the computer network 1606. The ISP connects the client devices 1620-1, 1620-2, and 1620-3 using a data transmission technology appropriate for delivering Internet Protocol datagrams, such as dial-up, digital subscriber line (DSL), cable modem, fiber, wireless or dedicated high-speed interconnects. The communications provider 1616 also provides, in some embodiments, messaging services, such as e-mail, instant messaging, and short message service (SMS) texting. Another type of a communications Provider is a network service provider (NSP), which sells bandwidth or network access by providing direct backbone access to the computer network 1606. Examples of network service providers include telecommunications companies, data carriers, wireless communications providers, Internet service providers, cable television operators offering high-speed Internet access, etc.

A data exchange 1618 interconnects the several modules inside INSP 1302 and connects these modules to the client devices 1620-1, 1620-2, and 1620-3 via computer network 1606. The data exchange 1618 covers, in various embodiments, a small area where all the modules of INSP 1602 are in close proximity, or covers a large geographic area when the different modules are geographically dispersed. For example, the data exchange 1602 includes a fast Gigabit Ethernet within a cabinet of a data center, or an intercontinental virtual LAN.

In some embodiments, communication between the server system and the client devices 1620-1 through 1620-3 may be facilitated using wireless technologies. Such technologies may include, for example, 5G wireless communication technologies. 5G is the fifth generation of cellular network technology. 5G networks are digital cellular networks, in which the service area covered by providers is divided into small geographical areas called cells. Analog signals representing sounds and images are digitized in the telephone, converted by an analog-to-digital converter and transmitted as a stream of bits. All the 5G wireless devices in a cell communicate by radio waves with a local antenna array and low power automated transceiver (transmitter and receiver) in the cell, over frequency channels assigned by the transceiver from a pool of frequencies that are reused in other cells. The local antennas are connected with the telephone network and the Internet by a high bandwidth optical fiber or wireless backhaul connection. As in other cell networks, a mobile device crossing from one cell to another is automatically transferred to the new cell. It should be understood that 5G networks are just an example type of communication network, and embodiments of the disclosure may utilize earlier generation wireless or wired communication, as well as later generation wired or wireless technologies that come after 5G.

It should be noted that in various embodiments, one or more features of some embodiments described herein are combined with one or more features of one or more of remaining embodiments described herein.

Embodiments described in the present disclosure may be practiced with various computer system configurations including hand-held devices, microprocessor systems, microprocessor-based or programmable consumer electronics, minicomputers, mainframe computers and the like. In one implementation, the embodiments described in the present disclosure are practiced in distributed computing environments where tasks are performed by remote processing devices that are linked through a wire-based or wireless network.

With the above embodiments in mind, it should be understood that, in one implementation, the embodiments described in the present disclosure employ various computer-implemented operations involving data stored in computer systems. These operations are those requiring physical manipulation of physical quantities. Any of the operations described herein that form part of the embodiments described in the present disclosure are useful machine operations. Some embodiments described in the present disclosure also relate to a device or an apparatus for performing these operations. The apparatus is specially constructed for the required purpose, or the apparatus is a general-purpose computer selectively activated or configured by a computer program stored in the computer. In particular, in one embodiment, various general-purpose machines are used with computer programs written in accordance with the teachings herein, or it may be more convenient to construct a more specialized apparatus to perform the required operations.

In an implementation, some embodiments described in the present disclosure are embodied as computer-readable code on a computer-readable medium. The computer-readable medium is any data storage device that stores data, which is thereafter read by a computer system. Examples of the computer-readable medium include a hard drive, a network-attached storage (NAS), a ROM, a RAM, a compact disc ROM (CD-ROM), a CD-recordable (CD-R), a CD-rewritable (CD-RW), a magnetic tape, an optical data storage device, a non-optical data storage device, etc. As an example, a computer-readable medium includes computer-readable tangible medium distributed over a network-coupled computer system so that the computer-readable code is stored and executed in a distributed fashion.

Moreover, although some of the above-described embodiments are described with respect to a gaming environment, in some embodiments, instead of a game, other environments, e.g., a video conferencing environment, etc., is used.

Although the method operations were described in a specific order, it should be understood that other housekeeping operations may be performed in between operations, or operations may be adjusted so that they occur at slightly different times, or may be distributed in a system which allows the occurrence of the processing operations at various intervals associated with the processing, as long as the processing of the overlay operations are performed in the desired way.

Although the foregoing embodiments described in the present disclosure have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein, but may be modified within the scope and equivalents of the appended claims.

The invention claimed is:

1. A method for processing a self-coaching interface, comprising,
identifying a gameplay event during gameplay by a user, wherein the gameplay event is tagged as falling below a skill threshold while a game is being played by the user;
generating a recording for a window of time for the gameplay event;
processing game telemetry for the recording of the gameplay event, wherein the game telemetry is used to identify a progression of interactive actions before the gameplay event for the window of time; and
generating overlay content in the self-coaching interface, wherein the overlay content is applied to one or more image frames of the recording when viewed via the self-coaching interface, the overlay content appearing in the one or more image frames during a playback of the recording,
wherein the overlay content provides hints for increasing a skill of the user to be above the skill threshold for the tagged gameplay event.

2. The method of claim 1, wherein the window of time includes a time period before the gameplay event, a time of the gameplay event, and a time period after the gameplay event.

3. The method of claim 1, wherein the window of time changes with the gameplay event and other gameplay events occurring before the gameplay event.

4. The method of claim 1, wherein the game telemetry is processed to identify a reason for the skill of the user to fall below the threshold.

5. The method of claim 4, wherein the game telemetry includes one or more game states that are processed to identify a virtual object that is not in the recording for the time window.

6. The method of claim 1, wherein the progression of interactive actions includes a movement of a virtual object that is not in the recording for the time window.

7. The method of claim 6, wherein the overlay content includes the virtual object.

8. The method of claim 6, wherein the overlay content includes a frame that is placed around the virtual object.

9. The method of claim 1, further comprising:
generating a timeline scrubber;
receiving a selection of a segment of the timeline scrubber; and
modifying the self-coaching interface and the overlay content based on a selection of the segment.

10. The method of claim 1, further comprising generating another self-coaching interface for display with the self-coaching interface, wherein the other self-coaching interface is associated with game play of another user and is of the same type as the gameplay event.

11. The method of claim 1, further comprising generating another self-coaching interface for display with the self-coaching interface, wherein the other self-coaching interface is associated with a different gaming session of game play of the user and is of the same type as the gameplay event.

12. The method of claim 1, further comprising training an artificial intelligence model to determine whether to initiate a coaching session in which the overlay content is overlaid on the self-coaching interface.

13. The method of claim 1, wherein the self-coaching interface excludes one or more virtual objects that are displayed in a virtual scene during occurrence of the gameplay event.

14. The method of claim 1, wherein the self-coaching interface includes one or more virtual objects that are not displayed in a virtual scene during occurrence of the game play event.

15. A server system for processing a self-coaching interface, comprising,
    a processor configured to:
        identify a gameplay event during gameplay by a user, wherein the gameplay event is tagged as falling below a skill threshold while a game is being played by the user;
        generate a recording for a window of time for the gameplay event;
        process game telemetry for the recording of the gameplay event, wherein the game telemetry is used to identify a progression of interactive actions before the gameplay event for the window of time; and
        generate overlay content in the self-coaching interface, wherein the overlay content is applied to one or more image frames of the recording when viewed via the self-coaching interface, the overlay content appearing in the one or more image frames during a playback of the recording,
        wherein the overlay content provides hints for increasing a skill of the user to be above the skill threshold for the tagged gameplay event; and
    a memory device coupled to the processor for storing the recording of the game play event.

16. The server system of claim 15, wherein the processor is configured to generate another self-coaching interface for display with the self-coaching interface, wherein the other self-coaching interface is associated with game play of another user and is related to the gameplay event.

17. The server system of claim 15, wherein the processor is configured to generate another self-coaching interface for display with the self-coaching interface, wherein the other self-coaching interface is associated with a different gaming session of game play of the user and with the gameplay event.

18. The server system of claim 15, wherein the window of time changes with the gameplay event and other gameplay events occurring before the gameplay event.

19. A system for processing a self-coaching interface, comprising,
    a client device configured to be used by a user to facilitate generation of gameplay event while playing a game;
    a server coupled to the client device via a computer network, wherein the server is configured to:
        identify the gameplay event, wherein the gameplay event is tagged as falling below a skill threshold while a game is being played by the user;
        generate a recording for a window of time for the gameplay event;
        process game telemetry for the recording of the gameplay event, wherein the game telemetry is used to identify a progression of interactive actions before the gameplay event for the window of time; and
        generate overlay content in the self-coaching interface, wherein the overlay content is applied to one or more image frames of the recording when viewed via the self-coaching interface, the overlay content appearing in the one or more image frames during a playback of the recording,
    wherein the overlay content provides hints for increasing a skill of the user to be above the skill threshold for the tagged gameplay event.

20. The system of claim 19, wherein the server system is configured to generate another self-coaching interface for display with the self-coaching interface, wherein the other self-coaching interface is associated with game play of another user and is related to the gameplay event.

* * * * *